United States Patent [19]

Bagley et al.

[11] Patent Number: 5,548,700
[45] Date of Patent: * Aug. 20, 1996

[54] EDITING TEXT IN AN IMAGE

[75] Inventors: Steven C. Bagley, Palo Alto; Gary E. Kopec, Belmont, both of Calif.

[73] Assignee: Xerox Corporation, Stamford, Conn.

[*] Notice: The portion of the term of this patent subsequent to Dec. 29, 2009, has been disclaimed.

[21] Appl. No.: 39,553

[22] Filed: Mar. 29, 1993

Related U.S. Application Data

[63] Continuation of Ser. No. 459,022, Dec. 29, 1989, abandoned.

[51] Int. Cl.⁶ .................................................. G06F 17/00
[52] U.S. Cl. ........................ 395/144; 395/100; 395/146
[58] Field of Search ................................ 395/144, 145, 395/146–149, 150, 151; 381/43; 382/56

[56] References Cited

U.S. PATENT DOCUMENTS

| | | | |
|---|---|---|---|
| 4,408,342 | 10/1983 | Grabowski et al. | 382/9 |
| 4,516,262 | 5/1985 | Sakurai | 382/18 |
| 4,610,025 | 9/1986 | Blum et al. | 382/9 |
| 4,739,477 | 4/1988 | Barker et al. | 364/300 |
| 4,860,376 | 8/1989 | Tanka et al. | 382/57 |

(List continued on next page.)

FOREIGN PATENT DOCUMENTS

| | | |
|---|---|---|
| 312235 | 4/1989 | European Pat. Off. . |
| 325417 | 7/1989 | European Pat. Off. . |
| 167342B1 | 8/1992 | European Pat. Off. . |
| 58-12064 | 1/1983 | Japan . |

(List continued on next page.)

OTHER PUBLICATIONS

Suenaga, Y., "Some Techniques for Document and Image Preparation," *Systems and Computers in Japan*, vol. 17, No. 3, 1986, pp. 35–46.

Stallman, R. *GNU Emacs Manual*, Sixth Edition, Version 18, Free Software Foundation, Cambridge, Mass., Mar. 1987, pp. 1–30.

(List continued on next page.)

*Primary Examiner*—Almis R. Jankus

[57] ABSTRACT

Character level text editing is performed on an image without recognizing characters, by operating on a character-size array obtained from a two-dimensional array defining an image region. A processor, in response to a request for a text editing operation, accesses an edit data structure that includes the image region array and performs the operation. The character-size array is obtained by dividing the image region array when necessary. An image region array that includes more than one line is divided along interline spaces. An image region array that includes one line is divided along intercharacter spaces. Character-size arrays are divided out of larger arrays by finding connected component bounding boxes, and then determining from the bounding boxes whether the connected components are likely to form a character. If so, the connected components are used to obtain the character-size array and spatial data about position, size, and shape of the character. Smaller arrays and spatial data can replace a larger array in the edit data structure. Smaller arrays are obtained only as necessary to perform a requested text editing operation, and if the edit data structure is not otherwise modified, obtaining a smaller array does not necessitate redrawing of the display. In addition to character level editing, a text editing operation can be performed on a sequence of arrays, such as a word, line, or a sequence that begins on one line and ends on another. The spatial data can be used to position arrays after insertion or deletion, to advance a cursor through the text, and to justify a line of arrays. A character-size array can be assigned to a keyboard key, and the key may then be used to insert that array into the text or to request a search for other arrays matching that array.

79 Claims, 14 Drawing Sheets

Microfiche Appendix Included
(2 Microfiche, 157 Pages)

U.S. PATENT DOCUMENTS

| | | | |
|---|---|---|---|
| 4,881,130 | 11/1989 | Hayashi | 358/443 |
| 4,897,804 | 1/1990 | Kawakami et al. | 364/521 |
| 4,914,709 | 4/1990 | Rudak | 382/57 |
| 4,974,194 | 11/1990 | Barker et al. | 364/900 |
| 5,003,614 | 3/1991 | Tanaka et al. | 382/18 |
| 5,010,581 | 4/1991 | Kanno | 382/56 |
| 5,021,973 | 6/1991 | Hernandez et al. | 364/521 X |
| 5,022,081 | 6/1991 | Hirose et al. | 381/43 |
| 5,142,620 | 8/1992 | Watanabe et al. | 395/164 |
| 5,167,016 | 11/1992 | Bagley et al. | 395/144 |
| 5,224,038 | 6/1993 | Bespalko | 364/419 |

FOREIGN PATENT DOCUMENTS

| | | |
|---|---|---|
| 61-272865 | 12/1986 | Japan . |
| 63-197266 | 8/1988 | Japan . |
| 63-293682 | 11/1988 | Japan . |
| 1-228066 | 9/1989 | Japan . |

OTHER PUBLICATIONS

Kim, S. E., *Viewpoint: Toward a Computer for Visual Thinkers*, University Microfilms, Ann Arbor, 1988, pp. 22–97, 115, and 123–131.

Suenaga, Y., and Nagura, M., "A Facsimile Based Manuscript Layout and Editing System by Auxiliary Mark Recognition," *5th International Conference on Pattern Recognition Proceedings*, Dec. 1–4, 1980, vol. 2, pp. 856–858.

Suenaga, Y., "A Facsimile Based Text Editor Using Handwritten Mark Recognition," *Proceedings of the Sixth International Joint Conference on Artificial Intelligence, Tokyo, Aug. 20–23, 1979*, vol. 2, 1979, pp. 856–858.

Wong, K. Y., Casey, R. G., and Wahl, F. M., "Document Analysis System," *IBM Journal of Research and Development*, vol. 26, No. 6, Nov. 1982, pp. 647–656.

Casey, R. G., and Wong, K. Y., "Text Recognition Using Adaptive Software," *Globecom '85*, vol. 1, IEEE, 1985, pp. 353–357.

Nagy, G., and Seth, S., "Hierarchical Representation of Optically Scanned Documents," *Proceedings of IEEE 7th International Conference on Pattern Recognition*, 1984, pp. 347–349.

Nagy, G., Kanai, J., Krishnamoorthy, M., Thomas, M., and Viswanathan, M., "Two Complementary Techniques for Digitized Document Analysis," *ACM Conference on Document Processing Systems*, Sante Fe, N.M., Dec. 5–9, 1988, pp. 169–176.

Kleper, M. L., *The Illustrated Handbook of Desktop Publishing and Typesetting*, TAB Books, 1987, pp. 298–305.

Pratt, W. K., Capitant, P. J., Chen, W. H., Hamilton, E. R., and Wallis, R. H., "Combined Symbol Matching Facsimile Data Compression System," *Proceedings of the IEEE, vol. 68, No. 7, Jul. 1980, pp. 786–796*.

J. Kanai, M. S., Krishnamoorthy, and T. Spencer, "Algorithms for Manipulating Nested Block Represented Images," Advance Printing of Paper Summaries, SPSE's 26th Fall Symposium, Arlington, Virginia, Oct. 1986, pp. 190–193.

S. N. Srihari, "Document Image Analysis: An Overview of Algorithms," Advanced Printing of Symposium Summaries, SPSE's 40th Annual Conference and Symposium on Hybrid Imaging Systems, Rochester, NY, May 1987, pp. 28–31.

Pavlidis, T., Algorithms for Graphics and Image Processing, Computer Science Press, Rockville, MD, 1982, p. 134.

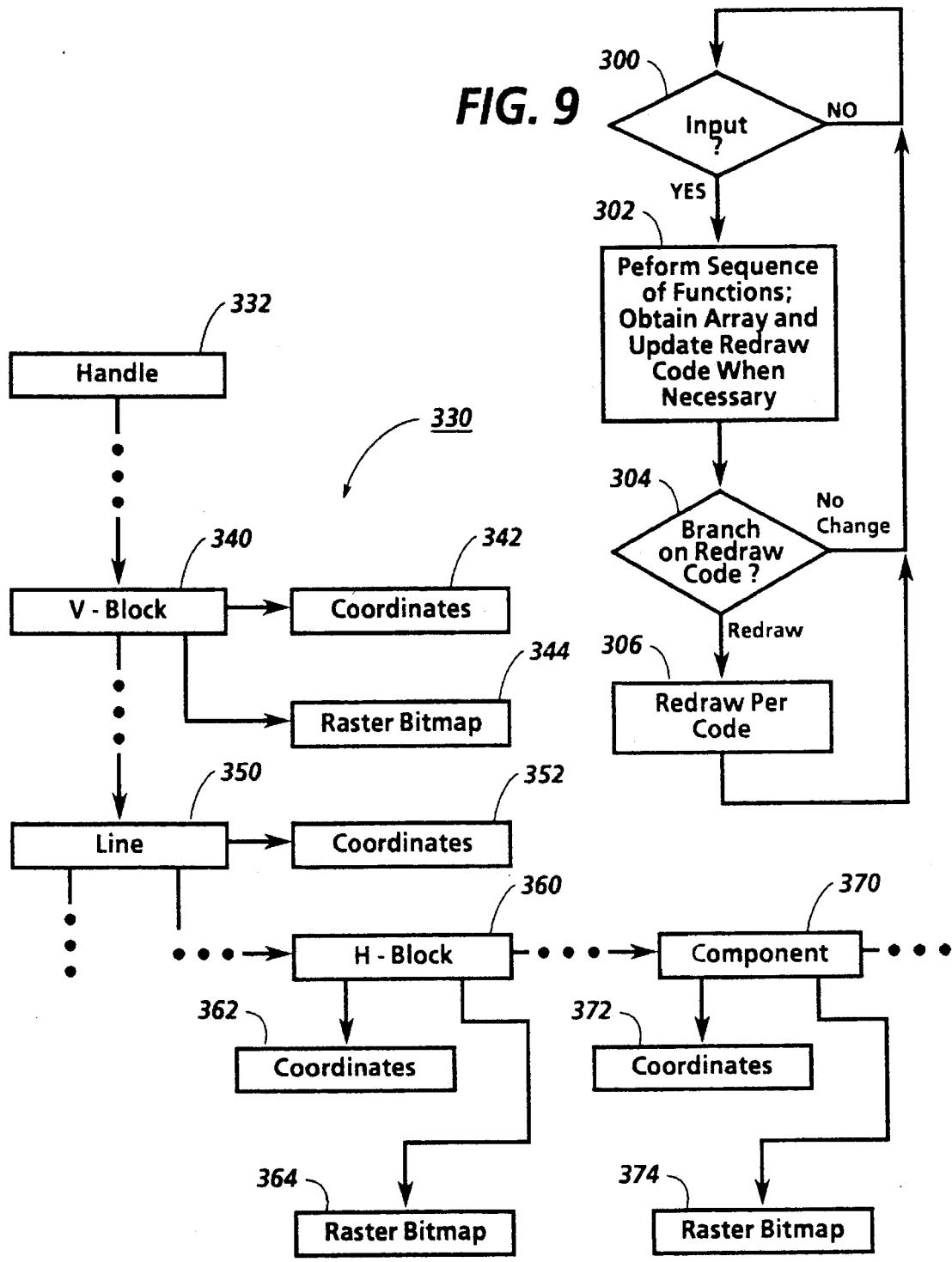

EDITING TEXT IN AN IMAGE

This is a continuation of application Ser. No. 07/459,022, filed Dec. 29, 1989 now abandoned.

The microfiche appendix submitted herewith, referred to herein as Microfiche Appendix A, includes two (2) microfiche with a total of 157 frames, and is incorporated herein by reference.

BACKGROUND OF THE INVENTION

This invention was made with Government support under Contract; No. N00140-86-C-8996 awarded by the Defense Advanced Research Projects Agency (DARPA). The Government has certain rights in this invention.

The present invention relates to techniques for image processing. More specifically, the invention relates to editing an image of text defined by digital data. For example, the image can be defined by a two-dimensional data array.

Kim, S. E., *Viewpoint: Toward a Computer for Visual Thinkers*, University Microfilms, Ann Arbor, 1988, pp. 22–97, 115, and 123–131 describes Viewpoint, a text and graphics editor. Pages 22–23 describe pixels, indicating that every structure in Viewpoint can be edited as pixels. Pages 24–25 describe Viewpoint, indicating that the representative form of structured graphics in Viewpoint is text, which uses a single, fixed width font, positioned on a fixed grid of square cells to simplify character parsing; text and graphics editing both work on cells. Pages 29–81 describe a demonstration of Viewpoint, with illustrations: Page 36 shows the effect of selecting a cell, including a large scale reproduction in a special screen area; pages 38–39 illustrate copying; pages 42–57 describe typing, including word wrap on encountering a noncharacter, deletion, font editing, and overtyping; pages 58–69 describe a visual boot, showing how the keyboard is built up; pages 70–81 describe edges of the system, including typing off the edge of the screen and drawing over a key border or a key image. Pages 84–97 describe inner workings of Viewpoint, with page 85 indicating that text is treated as a kind of graphics, page 93 describing how word wrap reveals the structure of text by pixel parsing to find the ends of lines and word breaks. Page 115 describes text editors, indicating that another editor stores text as a rectangular array of character cells and scans patterns of spaces and characters to locate paragraph and column breaks. Pages 123–125 are a Viewpoint manual, explaining at item 9 how typing a key copies the contents of the appropriate key image cell to the current cell, advancing the cursor one cell.

Suenaga, Y., and Nagura, M., "A Facsimile Based Manuscript Layout and Editing System by Auxiliary Mark Recognition," *5th International Conference on Pattern Recognition Proceedings*, Dec. 1–4, 1980, Vol. 2, pp. 856–858, describe an editor whose only input device is a FAX transmitter and whose only output device is a FAX receiver. FIG. 1 shows components of the system, including OCR, and FIG. 2 shows the processing flow, which includes a text editing subsystem and a graphics editing subsystem. The text editing subsystem, described on page 857, employs eleven handwritten auxiliary marks, shown in FIG. 3, which are input on separate paper from the text being edited. In response to an auxiliary mark, the text editing subsystem rearranges the binary picture of the text, as illustrated in FIGS. 4(a) and 4(b). The text format is estimated from the text picture. Marginal distribution (profile) and horizontal connectivity are used to divide the text picture into Segmented Blocks (SBs), corresponding to the rectangular regions which cover the individual characters in Japanese texts, individual words in alphanumeric texts, or graphics to be processed as binary patterns. A Segmented Block List (SBL) is constructed and used to extract and classify marks based on topological and metric features. A Mark Parameters List for Texts (MPL-T) is constructed. A Picture Allocation List (PAL), a list consisting of the SB numbers and their linkage addresses, is generated according to the MPL-T and SBL. Character strings or patterns are virtually deleted, moved, copied, and combined in PAL. The binary picture of the original text is rearranged according to the PAL to construct the fair copy.

Previous work is described in Suenaga, Y., "A Facsimile Based Text Editor Using Handwritten Mark Recognition," *Proceedings of the Sixth International Joint Conference on Artificial Intelligence, Tokyo, Aug.* 20–23, 1979, Vol. 2, 1979, pp. 856–858. Page 856 indicates that the method can be combined with usual text editors or word processors. Page 856 also states the assumption that characters must be placed according to ruled lines and describes the position mark drawn according to the ruled lines and from which the format and block size of manuscripts are estimated. Page 857 describes the picture allocation list (PAL) as consisting of block numbers and addresses indicating the order.

Wong, K. Y., Casey, R. G., and Wahl, F. M., "Document Analysis System," *IBM Journal of Research and Development*, Vol. 26, No. 6, November 1982, pp. 647–656, describe a system, shown in FIG. 1, that assists a user in encoding printed documents for computer processing. An Image Manipulation Editor (IEDIT) described at pages 648–649 reads and stores images on disk and provides image-editing functions such as copy, move, erase, etc. As described at pages 649–656, a digitized printed document is segmented and classified into regions of text and images. Blocks containing text can be analyzed with a pattern-matching program that groups similar symbols from the document and creates a prototype pattern to represent each group. During pattern matching, the position and matching prototype index for each text pattern is recorded; the position may be the coordinates of the lower left corner of the array representing the pattern. The prototype patterns are identified interactively or by automatic recognition logic.

SUMMARY OF THE INVENTION

The present invention provides character level editing of text appearing in an image defined by digital data. The image may, for example, be defined by a two-dimensional data array; such an array could be received from an image input device such as a scanner or camera, from a stored file, or from any other source. The techniques according to the invention do not rely on recognition of characters within the text or on prior information about the sizes, shapes, and positions of the characters but rather operate on characters as sets of connected components, also referred to as "blobs." When the user requests a text editing operation, an editor performs the requested operation on the sets of connected components.

Some aspects of the invention result from the recognition of fundamental problems in processing an image defined by a two-dimensional array of data. Such an image may include text, and it may be necessary to correct or otherwise modify text appearing in an image. But conventional text editing systems are not capable of editing text appearing in an image defined by an array.

Conventional word processors and similar text editing systems rely on complete information defining in advance the identities of the characters and their positioning. Such information is not explicitly available in an array defining an image. It might be possible to obtain such information with recognition techniques, but such techniques may be impractical for this application because of the errors they make or because of their computational requirements.

Another reason conventional text editing systems are inappropriate is that text in an image defined by an array may include a diversity of elements. The elements may include machine printed characters that are degraded or are difficult to recognize for some other reason. The elements may include hand printed characters or handwritten words which are difficult to recognize. The text may even include some elements that are not characters, but are positioned as if they were characters or words or parts of characters or words. Even those characters that are well-formed and recognizable may be positioned in a way that makes recognition of their alignment and spacing difficult. All of these features of text in an image interfere with conventional recognition techniques, which, in order to provide outputs in a standard form, may actually change the data defining the text region of the image when the text is not recognizable or when errors are made in recognition. As a result, if text editing is performed on the changed data, the results will not accurately reflect the contents of the original image.

One aspect of the invention is based on the recognition that these problems can be avoided by editing text in an image region by operating on a character-size array obtained from the image region's array rather than by attempting to obtain complete information about the identity and position of the character defined by the character-size array. This solution makes it unnecessary to recognize the character, and therefore ensures that the text will not be altered by the recognition process.

This solution can be implemented with an editor that receives a user signal requesting a character level text editing operation, obtains a character-size array from the image region array, and performs the requested operation on the character-size array. A first view of the image region can be presented before the request is received and a second, modified view can be presented after the operation is performed.

A system implementing this solution can include a processor that accesses the array, a user input device such as a keyboard with a mouse, an image input device such as a scanner, and an image output device such as a display. Prior to editing, the processor can receive signals from the scanner and produce an image input array defining the image. The edit data structure can include an array data unit that defines a respective smaller array obtained from the image input array. The array data unit could include the respective smaller array or could define it through compressed data or through a pointer. The processor can obtain, from a first array defining a region of the image that includes a character, a second array that defines a part of the region including only the character, and can then perform a character level text editing operation on the second array.

A closely related aspect of the invention is based on the discovery of a technique for obtaining character-size arrays from a larger array in a way that preserves all the information necessary for character level text editing. The technique is to obtain smaller arrays by dividing a larger array between lines and between characters until character-size arrays are obtained. The character-size arrays can then be manipulated within the edit data structure as necessary to perform a requested text editing operation.

This technique can be implemented, for example, by first dividing an array that includes more than one line of text between the lines of text until an array is obtained that includes only one line of text. The line array can then be divided between characters until a character-size array is obtained. If the lines of text are horizontal, the division between two lines of text can be made by operating on an array to find an interline space in the image. Similarly, the division between two characters can be made by finding an intercharacter space within an array that defines a line of text.

An array that cannot be divided between lines or between characters can nonetheless be divided based on its connected components. A set of connected components that is likely to be a character can be found based on the relative positions of the connected component bounding boxes. A bounding box can then be obtained for the set such that the bounding box defines a smaller array that includes only the character. If two connected components are not likely to form a character, each can be treated as a respective character.

Array data units defining smaller arrays can replace the data unit defining a larger array in the edit data structure. For example, an array that includes more than one line of text can be replaced by two or more smaller arrays, one defining a respective part of the image that includes one of the lines of text and the others including the remainder of the larger array. Similarly, an array defining all or part of a line of text can be replaced by two or more smaller arrays, one defining a respective part of the image that includes a character and the others defining respective parts that include the remainder of the larger array.

Even though the entire array defining an image could be replaced by smaller arrays of character size in the manner described above, this may require substantial processing time at the beginning of an editing session. Furthermore, the image may contain areas that do not obey the criteria used to identify divisible parts of the image; for example, the image may contain ruled lines, graphics, or other features that preclude dividing it in the manner described above.

These problems can be alleviated by obtaining smaller arrays only as necessary for the editing operations requested by the user. Specifically, when the user provides a request for a text editing operation, smaller arrays can be obtained to the extent necessary to handle the request. When the request indicates a position within the image, a smaller array defining the character at that position can be obtained from the array that includes data defining that position.

The technique of obtaining smaller arrays only when necessary introduces another problem. Each time a smaller array is obtained, the edit data structure is modified, even though the view based on the edit data structure has not changed. Redrawing the view each time the data structure is modified would require unnecessary computation and would produce unnecessary and distracting flicker of the view. On the other hand, when the data structure is modified during editing operations, redraw is often necessary to provide an accurate view of the edited version, and can be done by finding the modified parts of the edit data structure. This problem can be solved by storing data indicating whether redraw is necessary. After redrawing, this data is changed to indicate that redraw is not necessary. When the only change in the edit data structure is to replace an array with smaller arrays obtained from it, the redraw data is not changed. But when the data structure is modified by an editing operation, the redraw data is changed to indicate the necessary redraw.

A closely related aspect of the invention is based on the recognition of yet another problem in editing text in an image defined by data from an image input device. Frequently, the user will wish to type characters into the image, but the characters provided from a stored font might not match the characters in the image. This problem can be solved by providing a user interface through which the user can assign character-size arrays to the keys of the keyboard to provide copies of characters that appear in the image. Furthermore, the user can then request a search of the image for other arrays that match the array assigned to a key.

Because of the diversity of elements appearing in text, it may not always be possible to correctly divide an array into smaller character-size arrays. Furthermore, editing operations on character-size arrays can introduce some undesirable changes in the appearance of text; for example, the editor may rejustify a line in a way that is visibly different than other lines in the text. In addition, obtaining character-size arrays can be computationally expensive.

These problems can be alleviated by allowing the user to request a text editing operation on a sequence of characters as a region, in which case it may be possible to perform the requested operation without obtaining character-size arrays from all of the arrays that define the region. For example, the user could request an operation on one or more words, on an entire line, or on an extended sequence of arrays that begins on one line and ends on another. In response, the requested operation could be performed on the entire sequence of arrays without obtaining smaller arrays except for a few characters, avoiding the computation that would otherwise be necessary and also avoiding errors that might result.

Another basic aspect of the invention further avoids the problems with character recognition described above. This aspect is based on the discovery that the only additional information necessary to perform text editing operations on character-size arrays as described above is spatial information for use in positioning the arrays, so that text editing can be performed without character recognition. This solution can be implemented by obtaining spatial data indicating spatial information about a character within the image being edited; the spatial data can be included in the edit data structure in the data unit defining the character's array and, when needed, can be used to position the array. The spatial information may be about the size, shape, or position of the character. The spatial data may be obtained, for example, by finding a bounding box for a connected component set forming the character. The size and shape of the bounding box define the size and shape of the character and the bounding box position defines the character's position.

Several closely related aspects of the invention are based on the recognition of ways of using spatial data from a previous text editing operation in subsequent editing. In inserting a character that is a copy of another character, the spatial data of the array defining the copied character can be modified to obtain the spatial data of the copy. When a character is inserted next to another character, spatial data indicating the other character's transverse position can be used to position the inserted character transversely, and the other character's width and position can be used to obtain the inserted character's position along the line. After an insertion or a deletion, spatial data of characters following the inserted or deleted character can be modified so that they are appropriately positioned. If the space after a deleted character is an interword space, it can be maintained, and spaces can similarly be inserted and deleted by modifying the spatial data of following characters. A cursor can be advanced through text by detecting interword spaces that exceed a threshold and by detecting ends of lines. A line can be justified by adjusting the interword spaces.

The following description, the drawings and the claims further set forth these and other objects, features and advantages of the invention.

BRIEF DESCRIPTION OF THE DRAWINGS

FIG. 9 is a flow chart showing steps in a user input routine according to the invention.

FIG. 10 is a schematic representation of a data structure defining a version of an image according to the invention.

DETAILED DESCRIPTION

A. Conceptual Framework

Figure 1:
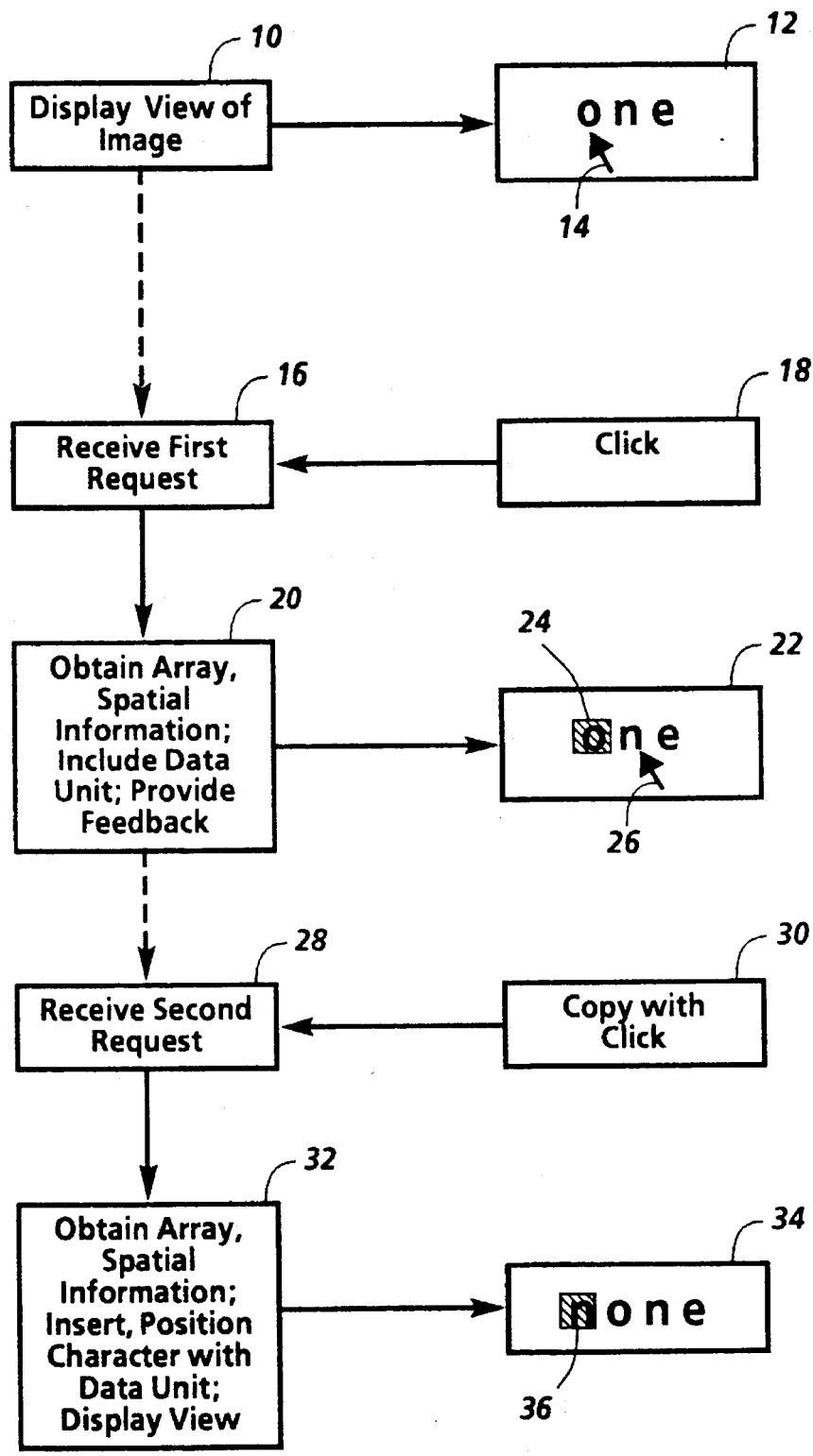
FIG. 1 is a flow chart showing stages in editing text in an image according to the invention.

The following conceptual framework is helpful in understanding the broad scope of the invention, and the terms defined below have the meanings indicated throughout this application, including the claims.

"Character" means a discrete element that appears in a writing system. Characters in the English language can thus include not only alphabetic and numerical elements, but also punctuation marks, diacritical marks, mathematical and logical symbols, and other elements included in writing English. More generally, characters can include, in addition to alphanumeric elements, phonetic, ideographic, or pictographic elements. A "character type" is a category of which a character may be an instance, such as the letter "a" or the number "3".

A "word" is a set of one or more characters that is treated as a semantic unit in a language. A "text" is an arrangement of one or more lines of characters; the characters of a text may form words.

An "image" is a pattern of light. An image may include characters, words, and text as well as other features such as graphics.

A "data structure" is any combination of interrelated items of data. An item of data is "included" in a data structure when it can be accessed using the locations or data of other items in the data structure; the included item of data may be another data structure. Conversely, an item of data can be "removed" from a data structure by rendering it inaccessible, such as by deleting it. An "array of data" or "data array" or "array" is a data structure that includes items of data that can be mapped into an array. A "two-dimensional array" is a data array whose items of data can be mapped into an array having two dimensions.

A data structure can be "obtained" from another data structure by operations that produce the data structure using data in the other data structure. For example, an array can be "obtained" from another array by operations such as producing a smaller array that is the same as a part of the other array, producing a larger array that includes a part that is the same as the other array, copying the other array, or modifying data in the other array or in a copy of it.

A "data unit" is an item of data that is accessible as a unit within a data structure. An "array data unit" is a data unit that includes data sufficient to define an array; for example, an array data unit may include the defined array itself, a compressed or encoded form of the defined array, a pointer to the defined array, a pointer to a part of another array from which the defined array can be obtained, or pointers to a set of smaller arrays from which the defined array can be obtained.

Data "defines" an image when the data includes sufficient information to produce the image. For example, a two-dimensional array can define all or any part of an image, with each item of data in the array providing a value indicating the color of a respective location of the image. A "character-size array" is a two dimensional array that defines only one character or character-size element.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

A "version" of a first image is a second image produced using data defining the first image. The second image may be identical to the first image, or it may be modified by loss of resolution, by changing the data defining the first image, or by other processes that result in a modified version. A "view" of an image is a version of the image that is displayed to a user; a view can omit some details of the image or can be otherwise modified.

A "text editing operation" is an operation that assumes that the data on which it is performed defines lines of elements that can be treated as if it were text. Examples of text editing operations include inserting and deleting elements, changing a characteristic of an element such as typeface, changing alignment and spacing, cursor positioning, justification, moving characters or a cursor to a following line, searching for a character or sequence of characters, and so forth.

A "character level text editing operation" is a text editing operation that affects a character or character-size element in text being edited. Examples of character level text editing operations include inserting, deleting, changing, or positioning a character; positioning a cursor on a character; searching for a character; and so forth.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "connected component set" or "component set" is a set of connected components that are treated as a unit. A character can therefore be a component set; for example, the letter "i" includes two connected components that are treated as a single character in English text-the connected components "form" the character. A "bounding box" for a character or other component set is a rectangle just large enough to include all the pixels in the component set, and can be specified by coordinates.

The data used to produce a modified version of an image that includes text can include information about a character in the text. "Identity information" about a character is information identifying its character type, case, typeface, point size, or the like. To "recognize" a character means to obtain identity information about the character from a digital form of an image that includes the character. "Spatial information" about a character is information identifying its spatial characteristics, such as its size, shape, position, orientation, alignment with other characters, or the like. Although spatial information and identity information are not completely independent, spatial information about a character can be obtained from a two-dimensional array defining an image without recognizing the character.

A "data processing system" is a system that processes data. A "data processor" or "processor" is any component or system that can process data, and may include one or more central processing units or other processing components. An "image input device" is a device that can receive an image and provide a signal defining a version of the image. A "scanner" is an image input device that receives an image by a scanning operation, such as by scanning a document. A "user input device" is a device such as a keyboard or a mouse that can provide signals based on actions of a user. The data from the user input device may be a "request" for an operation, in which case the system may perform the requested operation in response. An "image output device" is a device that can provide an image as output. A "display" is an image output device that provides information in visual form, such as on the screen of a cathode ray tube.

A processor "accesses" a data structure by any operation that retrieves or modifies data included in the data structure, such as by reading or writing data at a location in memory that is included in the data structure. A processor can be "connected for accessing" a data structure by any combination of connections with local or remote memory or input/output devices that permits the processor to access the data structure.

B. General Features

Figure 2:
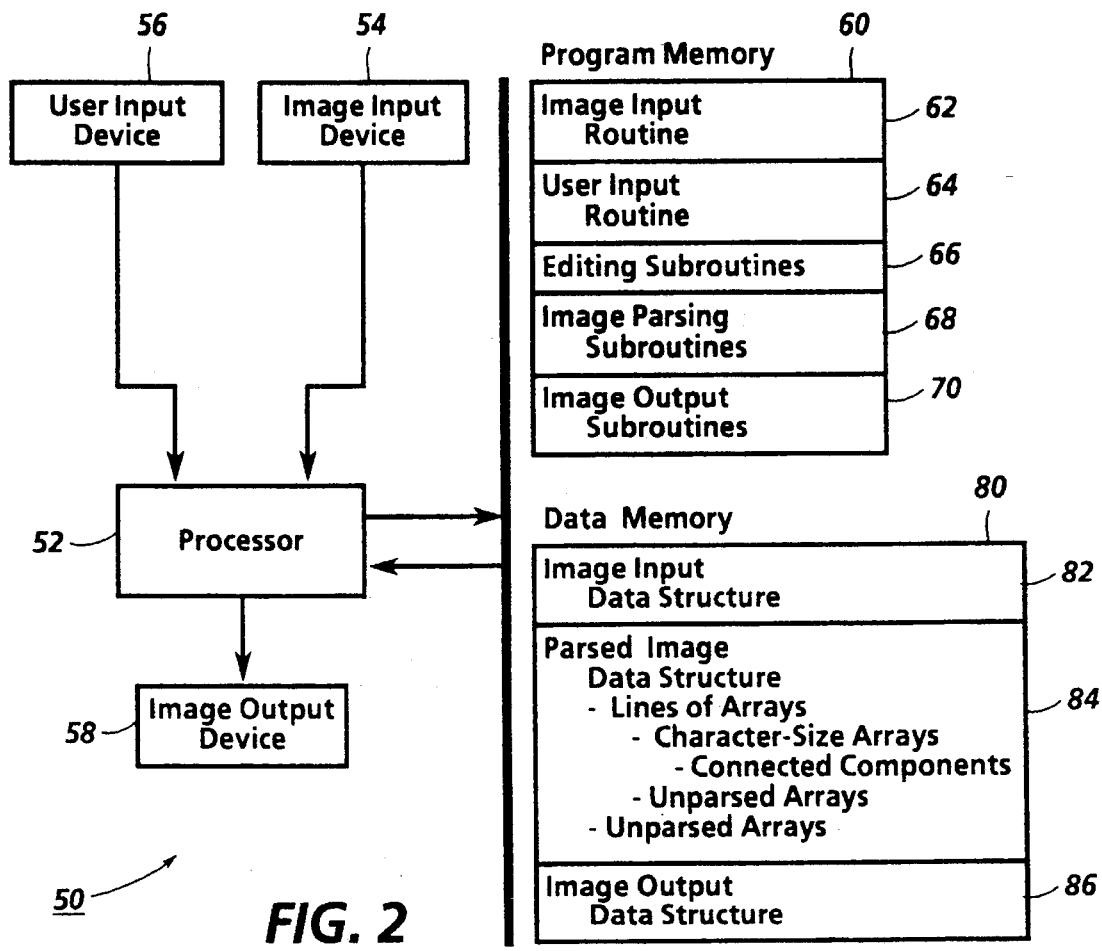
FIG. 2 is a block diagram showing general components of a system that can edit text in an image according to the invention.
Figure 3:
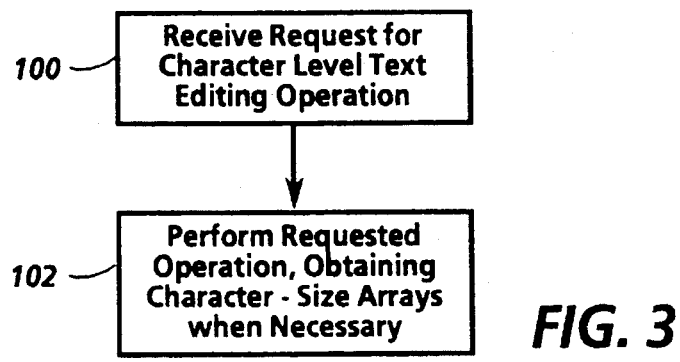
FIG. 3 is a flow chart showing general steps in a character level text editing operation according to the invention.
Figure 4:
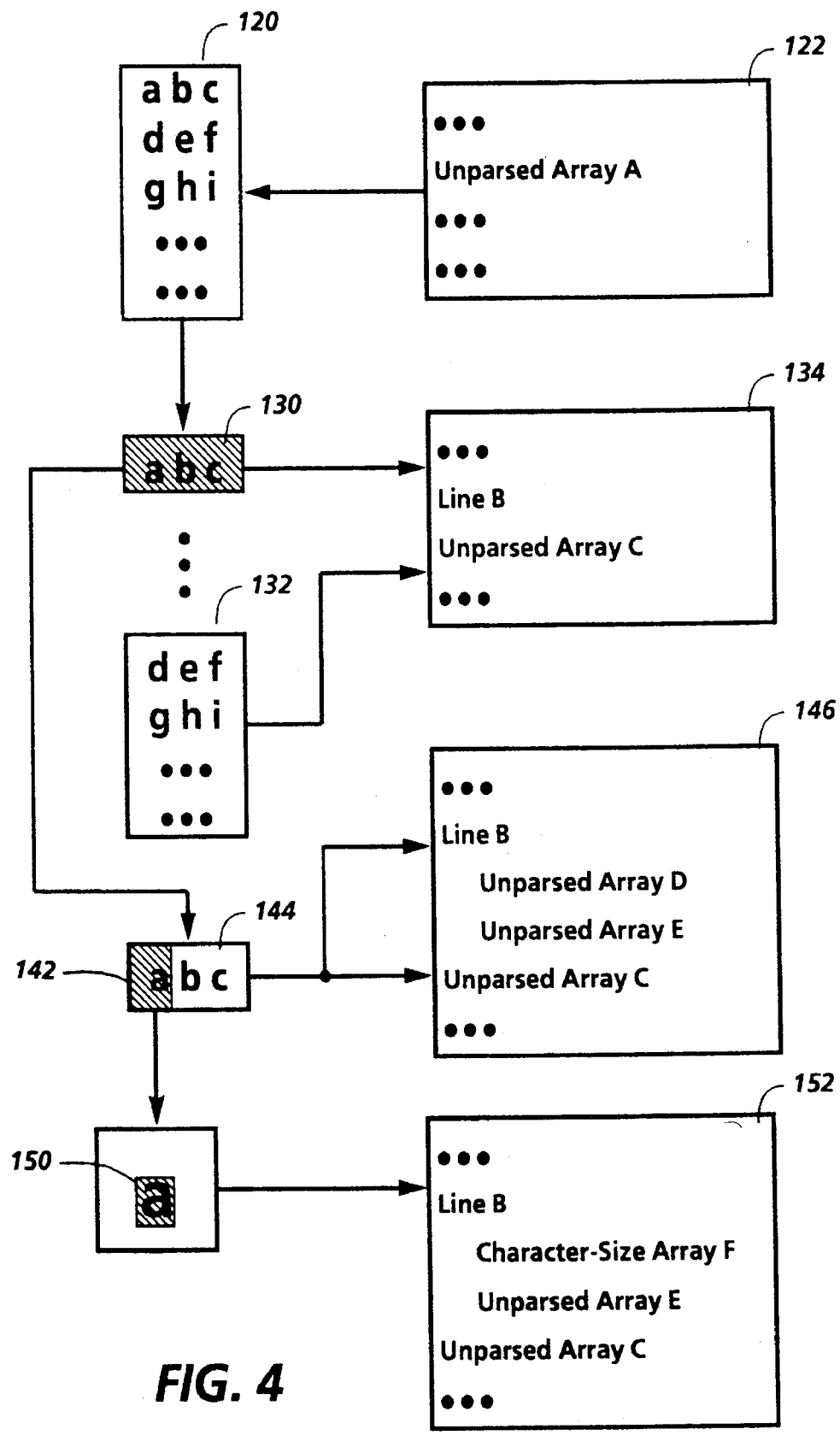
FIG. 4 is a flow chart illustrating steps in obtaining a character-size array that includes a single connected component according to the invention.
Figure 5:
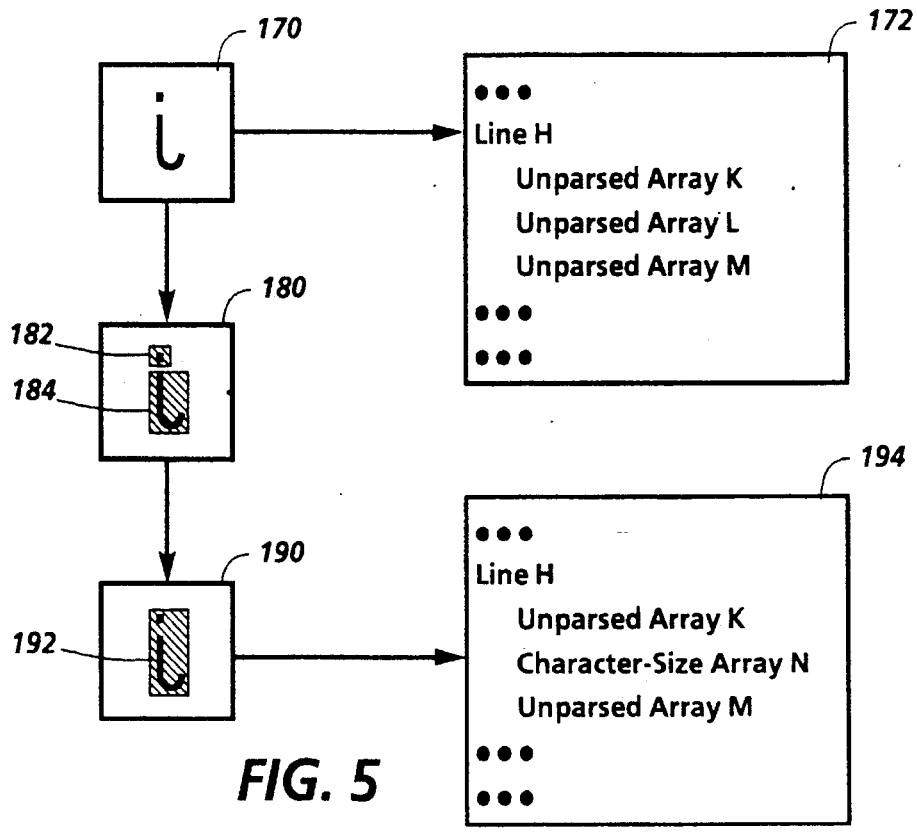
FIG. 5 is a flow chart illustrating steps in obtaining a character-size array that includes more than one connected component.
Figure 6:
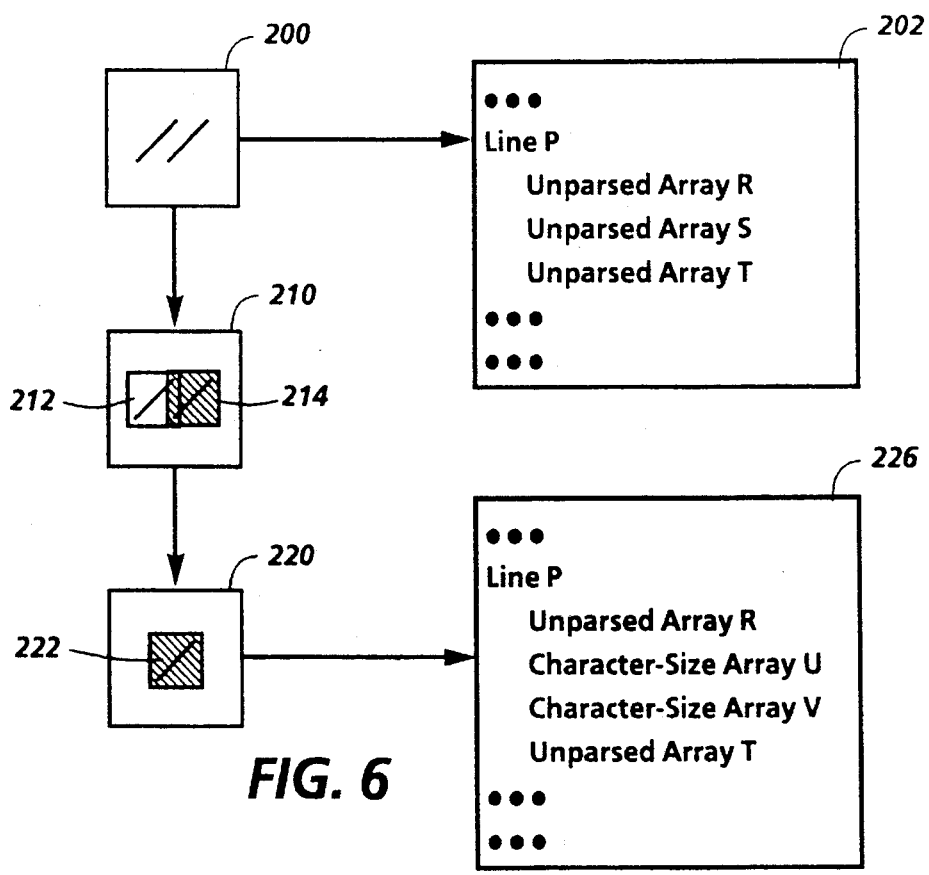
FIG. 6 is a flow chart illustrating steps in obtaining character-size arrays for connected components having potentially overlapping bounding boxes.
Figure 7:
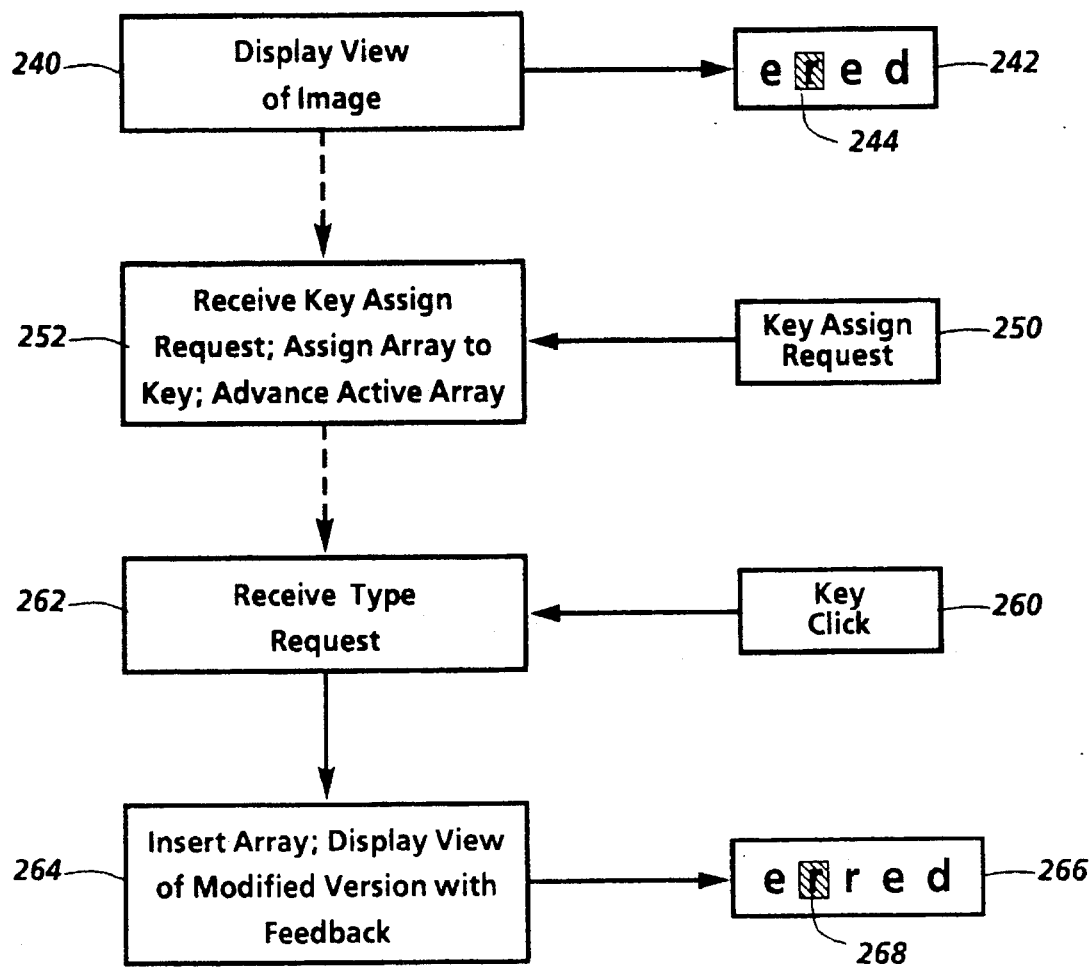
FIG. 7 is a flow chart showing general steps in assigning a character-size array to a keyboard key according to the invention.
Figure 8:
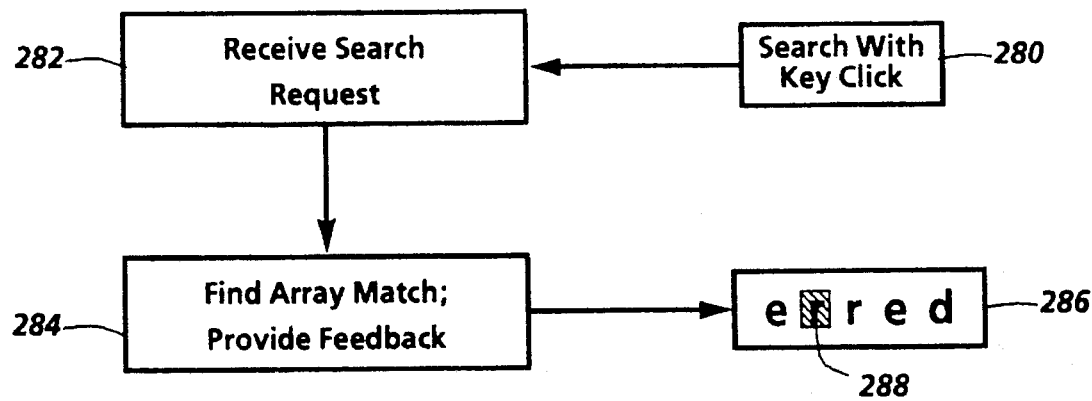
FIG. 8 is a flow chart showing general steps in searching for arrays that match a character-size array assigned to a key.

General features of the invention can be understood from FIGS. 1–8. FIG. 1 shows stages in character level text editing operations according to the invention. FIG. 2 shows general components of a system that can perform such editing. FIG. 3 shows general steps in a character level text editing operation performed by the processor of the system in FIG. 2. FIG. 4 illustrates steps in obtaining a character-size array that includes a single connected component. FIG. 5 illustrates steps in obtaining a character-size array that includes two connected components. FIG. 6 illustrates steps in finding two character-size arrays whose connected components have potentially overlapping bounding boxes. FIG. 7 shows steps in assigning a character to a key on a keyboard. FIG. 8 shows steps in searching for arrays that match a character-size array assigned to a key.

FIG. 1 includes two columns of boxes. Each box in the left column indicates a process performed by the processor of a system in a stage of editing, while each box in the right column indicates a user interface event, either by showing a part of a text as it would be displayed or by showing a user input action. The editing operations result in an edit data structure that defines a modified version of an image.

The process in box 10 is the display of a view of an image, which can be an image defined by a two-dimensional data array, such as a binary array. Box 12 shows a sequence of characters, "one", that appears in the view of the image, together with arrow 14 that is positioned to point to the character "o". The position of arrow 14 can be controlled through an appropriate user input device such as a mouse.

The process in box 16 receives a first request for a character level text editing operation from the user. In this case, the request indicates a position on a character, which can be a request to position a currently active area such as a cursor on the character. This request can be provided by a click, as illustrated in box 18. For example, a mouse button, a keyboard key, or another button or key could be clicked when arrow 14 is pointing to a character. Requests indicating a position do not always indicate a character—in other cases, they may indicate operations on a sequence of characters such as a word, a line, or an extended sequence that begins on one line and ends on another; in these cases, the indicated position may precede or follow the indicated sequence of characters.

In response to the request received in box 16, the process in box 20 obtains a smaller array from a larger array such as the image array. The process in box 20 also obtains spatial information about the part of the image defined by the smaller array. If the indicated part is a character, as illustrated, the process in box 20 obtains a character-size array and the spatial information may be about its size, shape, or position. The process in box 20 includes in the edit data structure an array data unit defining the array and the spatial information, and completes the requested operation by making this array data unit the currently active position for further text editing.

The process in box 20 also provides feedback to the user, as shown in box 22. Like box 12, box 22 shows the sequence of characters "one", but with darkened rectangle 24 around the character "o" to indicate the currently active position, which is illustratively the left edge of rectangle 24. Rectangle 24 can also be inverted or flashing. Box 22 also shows arrow 26, now positioned to point to the character "n".

The process in box 28 receives a second request from the user for another character level text editing operation. As illustrated in box 30, the requested operation is a copy operation, provided with a click to indicate a character to be copied to the currently active position, which is illustratively the position immediately preceding rectangle 24.

In response to the request received in box 28, the process in box 32 obtains a character-size array that defines the character to be copied, and also obtains spatial information about it. It then inserts a character by including in the edit data structure an array data unit defining the character-size array, positioned in the modified version of the image in accordance with the spatial information about the character to be copied and also about the character "o", obtained in box 20; character-size arrays and spatial information for other characters, both those neighboring the character to be copied and those neighboring the position in which the copy is being inserted, can also be obtained and used in positioning the inserted character.

The inserted character can be positioned by including appropriate position data in array data unit. Based on spatial information about spacings between characters, the inserted character can be positioned along the direction of the line of characters. Following characters on the line can be repositioned along the direction of the line to make room for the inserted character. Based on information about transverse character positions, the inserted character can also be positioned in a direction transverse to the line of characters.

When the requested operation is completed, a view of the modified version of the image is displayed, as shown in box 34, with darkened rectangle 36 around the inserted character "n" to indicate the currently active position.

System 50 in FIG. 2 includes processor 52, connected to receive signals from image input device 54 and user input device 56. Image input device 54 could be a scanner, a facsimile receiver or other image receiver, a camera, or other appropriate device or could be a part of local or remote memory that stores an image in digital form. User input device 56 could, for example, be a keyboard with a mouse. Processor 52 can also be connected to image output device 58, such as a screen display, a printer, a facsimile transmitter or other image transmitter, or a part of local or remote memory that can store an image in digital form.

Processor 52 is also connected to access program memory 60 and data memory 80. Program memory 60 includes image input routine 62, user input routine 64, editing subroutines 66, image parsing subroutines 68, and image output subroutines 70. Data memory 80 includes image input data structure 82, parsed image data structure 84, and image output data structure 86.

In executing image input routine 62, processor 52 loads data from image input device 54 into image input data structure 82, which is a two-dimensional data array. In response to signals from user input device 56, processor 52 performs user input routine 64, which may include calls to editing subroutines 66.

Editing subroutines 66 in turn may call image parsing subroutines 68 which obtain smaller arrays from the data array in image input data structure 82 or from previously obtained arrays. As shown, parsed image data structure 84 includes one or more subsidiary data structures called lines; each line data structure in turn includes one or more array data units, each defining either a character-size array that includes a set of one or more connected components or an unparsed array that could be further parsed into character-size arrays by image parsing subroutines 68. Similarly, parsed image data structure 84 can also include array data units defining unparsed arrays that could be further parsed by image parsing subroutines 68 to obtain line data structures. Parsed image data structure 84 can thus define a modified version of the image defined by image input data structure 82.

Editing subroutines 66 may also call image output subroutines 70, which produce image output data structure 86. Image output data structure 86 may be used to provide a view of the image defined by image input data structure 82 or to provide a view of the modified version of the image as defined by parsed image data structure 84. In either case, the view is provided to image output device 58.

FIG. 3 shows steps that can occur in a character level text editing operation, steps that can be performed by a processor such as processor 52 in system 50. A request for the text editing operation is received in box 100. In system 50, the request can be received by processor 52 from user input device 56.

In response, the step in box 102 performs the requested operation. In system 50, processor 52 can perform a character level text editing operation by executing the appropriate editing subroutines 66, during which it may access and modify parsed image data structure 84. When a text editing operation affects a character within an unparsed array, it may be necessary to obtain a character-size array for the character from the unparsed array. The array data unit defining the character-size array, as well as line data structures and other array data units defining character-size arrays and other arrays, can be manipulated within parsed image data structure 84 to perform the requested operation. Therefore, when necessary, processor 52 obtains a character-size array by executing image parsing subroutines 68, which may include finding a set of connected components that define a character or other element in an unparsed array.

The manipulation of parsed image data structure 84 by processor 52 could affect arrays defining one or more characters or other character-size sets of connected components, one or more words, one or more lines of text, a subsequence of text that begins on one line and ends on another, and so forth. The manipulation could include operations equivalent to one or more insertions or deletions. After this manipulation, parsed image data structure 84 defines the modified or edited version of the image. When the requested operation is completed, processor 52 can execute image output subroutines 70 to produce image output data structure 86, which can be used to provide an output image through image output device 58. This output image is a view of the modified or edited version of the image defined by parsed image data structure 84.

FIG. 4 illustrates steps that can be taken in dividing an unparsed array to obtain smaller arrays. These steps could occur in performing the step in box 102 in FIG. 3. Image part 120 is defined by the unparsed array being divided, and illustratively includes lines of text, each with several characters. The steps illustrated in FIG. 4 are performed in response to a user request indicating a position within the character "a" on the first line in image part 120. Based on the indicated position, processor 52 could access the array defining image part 120 by accessing the part of parsed image data structure shown in box 122 to find the smallest array that includes the indicated position. The parsed image data structure includes an array data unit for unparsed array A, which defines image part 120. This array data unit includes data indicating spatial information about unparsed array A, such as the size, shape, and position of image part 120; this data indicating spatial information is used to determine that the position indicated by the user request is within image part 120. The data unit also includes either a two-dimensional array defining image part 120 or a pointer to such an array.

The initial step in dividing unparsed array A is to divide from it data defining the line of text that includes the position indicated by the user request. This can be done, for example, by dividing along the blank horizontal spaces nearest to the position indicated. Image part 120 has no blank horizontal space above the indicated position, but has a blank horizontal interline space below it, and therefore unparsed array A can be divided into line array B, defining image part 130, and unparsed array C, defining image part 132. Image part 130 is shown shaded to indicate it includes the indicated position. Since these arrays include sufficient data to define all of image part 120 defined by unparsed array A, array data units defining them can replace the array data unit for unparsed array A, as in the part of parsed image data structure shown in box 134.

The next step is to divide from the current smallest array that includes the indicated position, line array B, a smaller part that includes the indicated position. This can be done, for example, by dividing along the blank vertical spaces nearest to the position indicated. In this manner, image part 130 can be divided along vertical intercharacter spaces into image parts 142 and 144, defined respectively by unparsed arrays D and E. Image part 142 is shown shaded to indicate it includes the indicated position. The data unit defining line array B is expanded to include array data units for each of these arrays, as in the part of parsed image data structure shown in box 146.

Finally, the current smallest array that includes the indicated position, unparsed array D, is analyzed to find connected components. Unparsed array D only contains one connected component, the character "a". This connected component can therefore be treated as a component set, meaning a set of connected components that are likely to be a character and are therefore manipulated as a unit. A character-size array that includes all of the component set is then obtained; in this case, character-size array F, which has a rectangular bounding box, defines image part 150, shown shaded to indicate that it includes the indicated position. Character-size array F together with spatial information indicating the position of image part 150 are sufficient to define unparsed array D. Therefore, an array data unit for character-size array F can replace the array data unit for unparsed array D in the part of parsed image data structure shown in box 152.

FIG. 4 thus illustrates dividing an unparsed array to find a character-size array that includes only one connected component that is the only component set in the unparsed array. FIG. 5 illustrates a case where the unparsed array includes two connected components that form one component set, and FIG. 6 illustrates a case where the unparsed array has two component sets whose bounding boxes could overlap.

In FIG. 5, an unparsed array has been accessed that defines image part 170, which includes an instance of the character "i". The array, unparsed array L with an array data unit in the part of parsed image data structure shown in box 172, could be accessed based on a user request indicating a position within the character "i". Therefore, unparsed array L is the current smallest array that includes the indicated position.

From the position of unparsed array L's data unit within the part of parsed image data structure shown in box 172, processor 52 can determine that the appropriate next step is to find connected components and, for each connected component, its bounding box. Image part 180 includes image parts 182 and 184, each defined by the bounding box of a connected component. Image part 182 includes the dot of the character "i", while image part 184 includes the body of the character "i" and is shaded to indicate that it includes the indicated position.

Upon finding more than one connected component in an unparsed array, processor 52 can apply rules to determine whether the connected components can be treated as a unit; these rules could be based on the likelihood that the connected components form a character. These rules can use data about the bounding boxes of the connected components, such as their sizes, shapes, or positions. For example, if bounding box data indicates the relatively small size of image part 182 and indicates its proximity to relatively large image part 184, a rule could indicate that the connected components in the image parts can be treated as a unit. Or, if bounding box data indicates that the centers of the bounding boxes are within a specified number of pixels of being vertically aligned, a rule could indicate that the connected components can be treated as a unit, and therefore form a component set.

Applying one of these rules, unparsed array L can be divided such that image part 190 includes image part 192, defined by character-size array N, a bounding box of the component set. Because the array data unit for character-size array N in the part of parsed image data structure shown in box 194 includes sufficient data to provide image part 190, it replaces the data unit for unparsed array L in the part of parsed image data structure shown in box 172. Image part 192 is shaded to indicate that it includes the indicated position.

In FIG. 6, an unparsed array has been accessed that defines image part 200, which includes two adjacent instances of the character "/", positioned with the bottom of the second below the top of the first such that no blank vertical line can go between them. The array, unparsed array S with an array data unit in the part of parsed image data structure shown in box 202, could be accessed based on a user request indicating a position within the second instance of the character "/". Therefore, unparsed array S is the current smallest array that includes the indicated position.

From the position of unparsed array S's data unit within the part of parsed image data structure shown in box 202, processor 52 can determine that the appropriate next step is to find connected components and, for each connected component, its bounding box. Image part 210 includes image parts 212 and 214, each defined by the bounding box of a connected component. Image part 212 includes the first instance of the character "/", while image part 214 includes the second and is shaded to indicate that it includes the indicated position.

Processor 52 can again apply rules to determine whether the two connected components found can be treated as a unit. Here, if bounding box data indicates that the centers of the bounding boxes are separated by more than a threshold, a rule could indicate that the connected components cannot be treated as a unit forming a component set. Therefore image part 220, obtained after applying the rules, includes only image part 222 containing the connected component whose bounding box is image part 214. Image part 222 does not include any part of the connected component whose bounding box is image part 212. The part of parsed image data structure shown in box 226 includes array data units for character-size arrays U and V, with character-size array V defining image part 222 and character-size array U defining a similar image part that contains the connected component whose bounding box is image part 212. The array data units for character-size arrays U and V replace the data unit for unparsed array S in the part of parsed image data structure shown in box 226. Image part 222 is shaded to indicate that it includes the indicated position.

FIG. 6 illustrates a special problem that arises where the bounding boxes of connected components could overlap. Image part 222 cannot be an actual part of image part 200, because then it would include one end of the connected component whose bounding box is image part 212. Therefore, the array data unit for character-size array V cannot be a pointer into the two-dimensional array defining image part 200. This problem can be solved by including a two-dimensional array defining image part 222 in the array data unit for character-size array V; this two-dimensional array can be obtained by starting with the connected component whose bounding box is image part 214 and obtaining a blank rectangular region around it.

FIG. 6 suggests another problem that may arise with component sets that have potentially overlapping bounding boxes: How should the system respond if the user indicates a position in the overlapping area? This problem could be solved by treating a position in the overlapping area as indicating a position in the connected component set whose center is leftmost.

Editing subroutines 66 can also include special operations involving character-size arrays. FIGS. 7 and 8 show examples of special editing operations that involve character-size arrays. FIG. 7 illustrates steps in assigning an array to a key on the keyboard of user input device 56. FIG. 8 illustrates steps in performing a search for an array which matches one which has been previously assigned to a key.

The steps in FIG. 7 could be preceded by steps like those in boxes 10 and 16 of FIG. 1 or other steps such as those in boxes 28 and 32, in either case resulting in an active array; in FIG. 1 the active array is indicated in box 22 by shaded area 24 and in box 34 by shaded area 36. The step in box 240, as in box 20 in FIG. 1, provides a view of an image, a portion of the view being shown in box 242 with shaded area 244 indicating that the character-size array that includes the character "r" in the sequence of characters "ered" within the view is the currently active array.

In box 250, the user provides a signal requesting a key assigning operation. For example, the user could have previously requested entry into a teach mode in which a series of arrays can be successively assigned to keys. While in the teach mode, each time the user depresses a key on the keyboard, the currently active array is assigned to the depressed key. Therefore, in box 252, processor 52 receives the request for a key assignment and performs appropriate editing subroutines 66 to assign the character-size array that includes the character "r" to the specified key, which could appropriately be the "r" key on the keyboard. In the teach mode, processor 52 could then move the currently active array to the next position in the text, so that the user could then type another key to assign the next array; in this manner, the user could type the sequence of characters in the text in order to assign the arrays of the text to keys on the keyboard, with an appropriate rule for combining or replacing arrays where the same character appears more than once in the text so that more than one array is assigned to the same key. Processor 52 could also perform appropriate image output subroutines 70 to provide feedback indicating key assignment, such as by presenting a view of a keyboard with each assigned array displayed in the position of the assigned key.

In general, rather than entering key assignments manually based on a text, the user should be able, through an appropriate signal, to request that a stored set of arrays be assigned to the keys, such as arrays for the characters of a given font of a typeface, or that arrays be assigned to the keys based on the results of character recognition. The user could also delete all earlier assignments upon entering the teach mode.

No matter how the assignment of arrays to keys is made, when the user clicks an assigned key in the type mode, as in box 260, processor 52 receives this as a request to type a character in box 262. Processor 52 then executes appropriate editing subroutines 66 to insert the character-size array or other array assigned to the specified key at the currently active position in the image. Processor 52 then executes appropriate image output subroutines 70 to display a view of the modified version of the image, in box 264. As shown in box 266, this view includes shaded area 268 indicating the inserted array—in this case a character-size array that includes the character "r".

Parsed image data structure 84 can also be searched for a character-size array that matches an array that has previously been assigned to a key, as illustrated in FIG. 8. The first event in FIG. 8 is a signal from user input device 56 indicating that the user has requested a search together with a click of the specified key assigned to a character-size array, in this case the key assigned to the character-size array that includes the character "r". In response, processor 52, receiving the request in box 282, finds a matching array in box 284. The matching array could be found with standard template matching and convolution techniques. Processor 52 then presents a view of the image in which the matching array is shaded, as shown in box 286 by shaded area 288.

We turn now to consider how the general features illustrated in FIGS. 1–8 could be implemented.

C. An Implementation

The general features described above could be implemented in many ways. We now consider two aspects of a successful implementation-image parsing and editing operations.

1. Image Parsing

Figure 11:
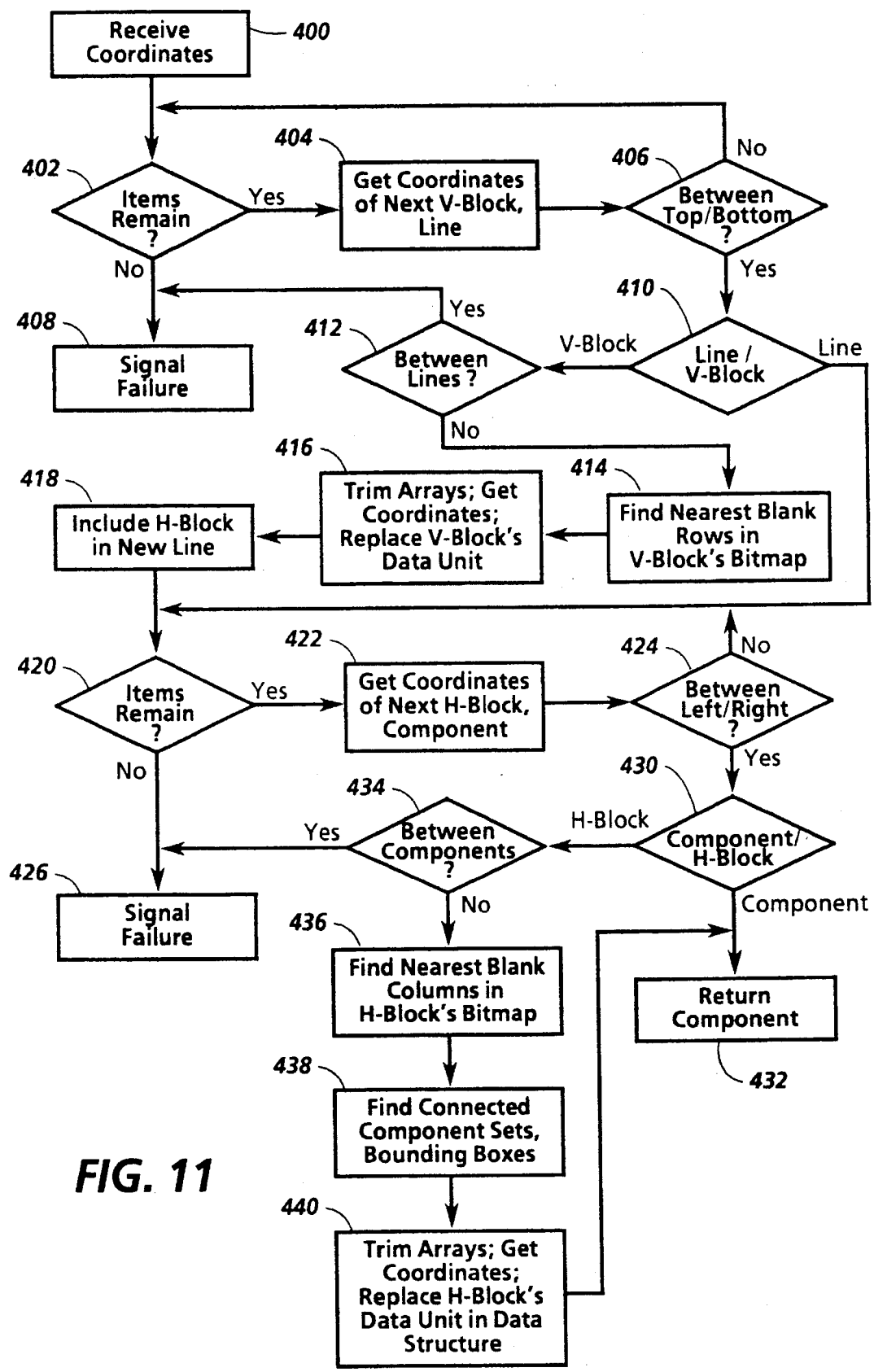
FIG. 11 is a flow chart showing steps in responding to a signal indicating a position within the image defined by the data structure of FIG. 10.

FIG. 9 illustrates steps in an implementation of user input routine 64, including steps discussed above in relation to FIG. 3 and also including steps relating to the interaction between redrawing and the division of unparsed arrays. FIG. 10 illustrates an implementation of parsed image data structure 84. FIG. 11 illustrates steps in an implementation of image parsing subroutines 68.

The routine illustrated in FIG. 9 tests in box 300 whether an input signal from user input device 56 has been received. If not, the routine repeats this test after an appropriate period of time. When a user input signal is received, the step in box 302 performs a sequence of one or more functions to handle the received signal. The functions that handle the input signals are implementations of editing subroutines 66. In performing the sequence of functions, the step in box 302 obtains character-size arrays when necessary as discussed above. It also updates a redraw code when necessary, to indicate the extent to which the view being displayed must be redrawn as a result of the sequence of functions being performed. If a function does not modify parsed image data structure 84 or only modifies it by obtaining smaller arrays from one or more unparsed arrays, additional redrawing is not necessary. But if the function modifies parsed image data structure 84 in other ways, additional redrawing is necessary for the part of the view affected by the modifications. The redraw code is updated when additional redrawing is necessary.

The redraw code may, for example, be a field whose value begins at zero, indicating no change has been made in parsed image data structure 84. The value can be increased to indicate, successively, a cursor move but no other change; one or more changes on the line on which the cursor is positioned; changes on more than one line; and so on until the highest value is reached, indicating a complete redraw is necessary.

When the sequence of functions is completed, the routine branches in box 304 based on the redraw code. If the redraw code indicates no change, the routine returns to box 300 to wait for another input signal. If the redraw code indicates redrawing is necessary, the step in box 304 redraws the affected part of the view based on the relevant part of parsed image data structure 84, resetting the redraw code upon completion. In general, the redraw operations are performed by calls to image output subroutines 70.

Linked list 330 in FIG. 10 illustrates an implementation of parsed image data structure 84 in FIG. 2, and the data in it provides sufficient spatial information to reconstruct a version of an image. Linked list 330 includes a number of smaller data structures, each represented in FIG. 10 by a box, with the links between data structures represented by arrows. Handle 332 is the entry point to linked list 330, and can be a simple data structure such as an identifier of the image.

The data structures in linked list 330 include two kinds of array data units— v-block (vertical block) data units and line data units—ordered in the sequence in which the arrays they define occur from top to bottom in an image. In general, the v-block arrays and line arrays do not overlap or abut but are always separated by a horizontally extending margin of at least one pixel; the technique for separating them depends on sensing a gap between the bottom of one and the top of the next. Subsequently, a line array can, however, be modified so that it overlaps or abuts an adjacent line array or v-block array.

V-block data unit 340 is relatively simple, and includes coordinates 342 and raster bitmap 344. Raster bitmap 344 can be rectangular but trimmed so that its boundaries surround all the connected components within it without leaving unnecessary space. Coordinates 342 can, for example, include x- and y-coordinates measuring the number of pixels separating the upper left-hand corner of raster bitmap 344 from the upper left-hand corner of the original image bitmap, thus defining the position of raster bitmap 344 within the original image. Coordinates 342 can also include length and height coordinates of raster bitmap 344, for use in determining whether a position indicated in a signal from user input device 56 is within raster bitmap 344. V-block data unit 340 thus defines an unparsed array of the image, and has not yet been divided into smaller arrays.

Line data unit 350, on the other hand, defines an array which has been divided from a v-block array and which may be further divided into smaller arrays. Like v-block data unit 340, line data unit 350 includes coordinates 352, which can include coordinates of a line array's upper left-hand corner but need not include its length and height, since any connected component within the line array is also within a smaller array; when needed, a length and height of a line can be computed from the dimensions of the smaller arrays in it.

As shown, line data unit 350 also includes a linked list data structure that can include two kinds of subsidiary array data units-h-block data units (horizontal blocks) and component data units-ordered in the sequence in which the arrays they define occur from left to right in the image. The array of a component data unit is a character-size array. In general, the h-block arrays and component arrays do not overlap or abut but are always separated by a vertical margin of at least one pixel; the technique for separating them depends on sensing a gap between the right side of one and the left side of the next. On the other hand, there may be instances where component arrays overlap, as in the example of FIG. 6.

H-block data unit 360 is relatively simple, and includes coordinates 362 and raster bitmap 364. As in v-block data unit 340, raster bitmap 364 can be rectangular but trimmed so that its boundaries surround all the connected components within it without leaving unnecessary space. Coordinates 362 can include coordinates of the upper left-hand corner of raster bitmap 364, measured in relation to the upper Left-hand corner coordinates of line data structure 350, and length and height coordinates. H-block data unit 360 thus defines an unparsed array of the image, and has not yet been divided into smaller arrays.

Component data unit 370, on the other hand, defines an array that results from analyzing an array like that defined by h-block data unit 360 to find its connected components and identify those that are likely to form a single character. Like h-block data unit 360, component data unit 370 includes coordinates 372 and raster bitmap 374. Coordinates 372 can include coordinates of the upper left-hand corner of raster bitmap 374, measured in relation to the upper left-hand corner coordinates of line data unit 350, and length and height coordinates or other coordinates defining the size and shape of the array defined by component data unit 370.

The upper left hand corner coordinates of line data unit 350 can initially be the upper left hand corner coordinates of the first array in the line array, ordinarily the h-block array that includes all the connected components in the line array. This upper left-hand corner remains the same thereafter, even though line data unit 350 may be modified to include component data units defining arrays to the left of and above the upper left-hand corner; therefore, the coordinates of component data units may be either positive or negative.

FIG. 11 illustrates steps in responding to a mouse click or other signal from user input device 56 indicating a position within the image defined by linked list 330. The position can be indicated by x- and y-coordinates measured in pixels from the upper left-hand corner of the image. These coordinates can be obtained from the screen coordinates of the position indicated by user input device 56 through computations that take into account the effects of scrolling and scaling operations. The step in box 400 in FIG. 11 receives these coordinates.

The step in box 402 begins an iterative loop to find the v-block or line data unit within linked list 330 that includes the y-coordinate of the indicated position. This loop goes through each item in linked list 330, accessing its coordinates in box 404, until the test in box 406 determines that the y-coordinate of the indicated position is between the top and bottom of an item. If the last item in linked list 330 is handled without finding an item that includes the y-coordinate of the indicated position, a failure signal is provided in box 408. Also, the items could be sorted by position, in which case the loop could terminate upon finding an item below the y-coordinate of the indicated position.

The routine branches in box 410 based on whether the item that includes the indicated position is a v-block or a line data unit. If a line data unit, no further division into line arrays is required at this time. If a v-block data unit, however, the step in box 412 determines whether the indicated position is between lines, which will be the case if it is in a blank row in the bitmap of the v-block data unit defining the array. If so, a failure signal is provided in box 408.

If the indicated position is not between lines, the step in box 414 prepares to divide the v-block array by finding, in the bitmap of the v-block data unit, the nearest blank horizontal space above and below the indicated position. This step can be done by searching up and down from the indicated position for a blank horizontal row of pixels or an edge of the v-block data unit's bitmap. A blank horizontal space should ordinarily be an interline space, so that this technique should find upper and lower bounds of the line of text that includes the indicated position.

The v-block array is thus divided into arrays at each of the blank spaces found in the step in box 414. The array between the blank spaces is treated as a line array, while any other resulting array is treated as a v-block array and is not divided further. The step in box 416, however, trims off any blank rows or columns of pixels along each edge of each v-block array and of the newly divided line array; obtains the coordinates for each v-block array and for the new line array, and replaces the original v-block data unit in linked list 330 with data units defining the smaller v-block arrays and the line array. The step in box 418 starts a subsidiary linked list within the line data unit, the only item in this subsidiary linked list initially being an h-block data unit with its coordinates and raster bitmap as illustrated in FIG. 10. This completes the division of the v-block array.

The step in box 420 begins an iterative loop to find the h-block or component array within a line array that includes the x-coordinate of the indicated position. This loop operates either on the data structure defining the newly divided line array from box 416 or on the line data structure identified in box 410. The step in box 422 accesses the coordinates of the next h-block or component data unit in the line data unit's subsidiary linked list. The loop continues until the test in box 424 determines that the x-coordinate of the indicated position is between the left and right sides of the next item. If the last item in the line data unit is handled without finding an item that includes the x-coordinate of the indicated position, a failure signal is provided in box 426. Also, the items could be sorted by position, in which case the loop could terminate upon finding an item to the right of the x-coordinate of the indicated position.

The routine branches in box 430 based on whether the item that includes the indicated position is an h-block or a component data unit. If the item is a component data unit, no further division into component arrays is required, and the step in box 432 returns the component data unit so that an editing operation can be performed. If the item is an h-block data unit, however, the step in box 434 determines whether the indicated position is between component arrays, which will be the case if it is in a blank vertical space in the bitmap of the h-block data unit defining the array. If so, a failure signal is provided in box 426.

If the indicated position is not between component arrays, the step in box 436 prepares to divide the h-block array it defines by finding, in the h-block data unit's bitmap, the nearest blank vertical space left and right of the indicated position. This step can be done by searching left and right from the indicated position for a blank vertical column of pixels or an edge of the h-block data unit's bitmap. A blank vertical space should ordinarily be an intercharacter space, so that this technique should find left and right bounds of a character that includes the indicated position.

The h-block array is thus divided into arrays at each of the blank spaces found in the step in box 436. The array between the blank spaces is then analyzed to find a component array, while any other resulting array is treated as an h-block array and is not divided further. In order to find a component array, the step in box 438 finds all connected components within an array, then finds the bounding box of each connected component, then groups the connected components into sets according to an appropriate rule, and finally obtains a component array for each component set.

Techniques for finding connected components are described in Ballard, D. H. and Brown, C. M., *Computer Vision*, Prentice Hall, 1982, p. 150. Pavlidis, T., *Algorithms for Graphics and Image Processing*, Computer Science Press, 1982, p. 134 discusses the meaning of connectedness.

An appropriate rule for grouping connected components in English text is that two components are grouped together if their horizontal center points are approximately vertically aligned, so that one is above or nearly above the other, as discussed above in relation to FIGS. 5 and 6. A more complete rule might group quote marks into a pair when appropriate.

When the components have been grouped into component sets, one of the component sets is determined to be the one that includes the indicated position or the one closest to the indicated position.

When the component arrays for the component sets have been obtained, the step in box 440 trims any blank rows or columns from the edges of the other arrays, which will then be treated as h-block arrays; obtains the coordinates of these h-block arrays and the newly divided component arrays; and replaces the original h-block data unit in the subsidiary linked list with array data units defining the new h-block arrays and component arrays.

This completes the division of the original h-block array. The step in box 432 then returns the data unit defining the component array that includes the indicated position so that an editing operation can be performed.

The techniques described above are effective for an image with text of suitable quality for editing. For an image in which text appears at a slant or skew, skew correction prior to editing may be necessary, and could be performed with standard techniques; for example, if text is skewed such that there is not a blank row of pixels between adjacent lines, the lines cannot be found unless the skew is corrected or a criterion other than a blank row of pixels is used to distinguish lines. Also, if characters within the text are joined together or broken into pieces due to noise, characters cannot be found by finding sets of connected components, so that it may be necessary to process the image to separate the characters or grow them together.

When the necessary division of unparsed arrays has been completed, an editing operation can be performed. We turn now to consider implementation of editing operations.

2. Editing Operations

Commercially available editors provide a wide variety of editing operations. We will consider editing operations that are of particular interest in text editing—cursor positioning, insertion, and deletion. Cursor positioning, in turn, relates to selection and search, while insertion and deletion lead directly to positioning, not only spacing between characters and transverse alignment, but also justification.

a. Cursor Positioning, Selection, and Search. When the relevant part of an image has been divided into component arrays as described above, cursor positioning can be performed in much the way it can be performed in a text editor that uses character codes, with a component array's data unit taking the place of the character code. But component array data units for spaces and carriage returns do not appear explicitly in parsed image data structure 330 because spaces and carriage returns are not connected components. Therefore, spaces and carriage returns present special problems for cursor positioning and related operations.

Figure 12:
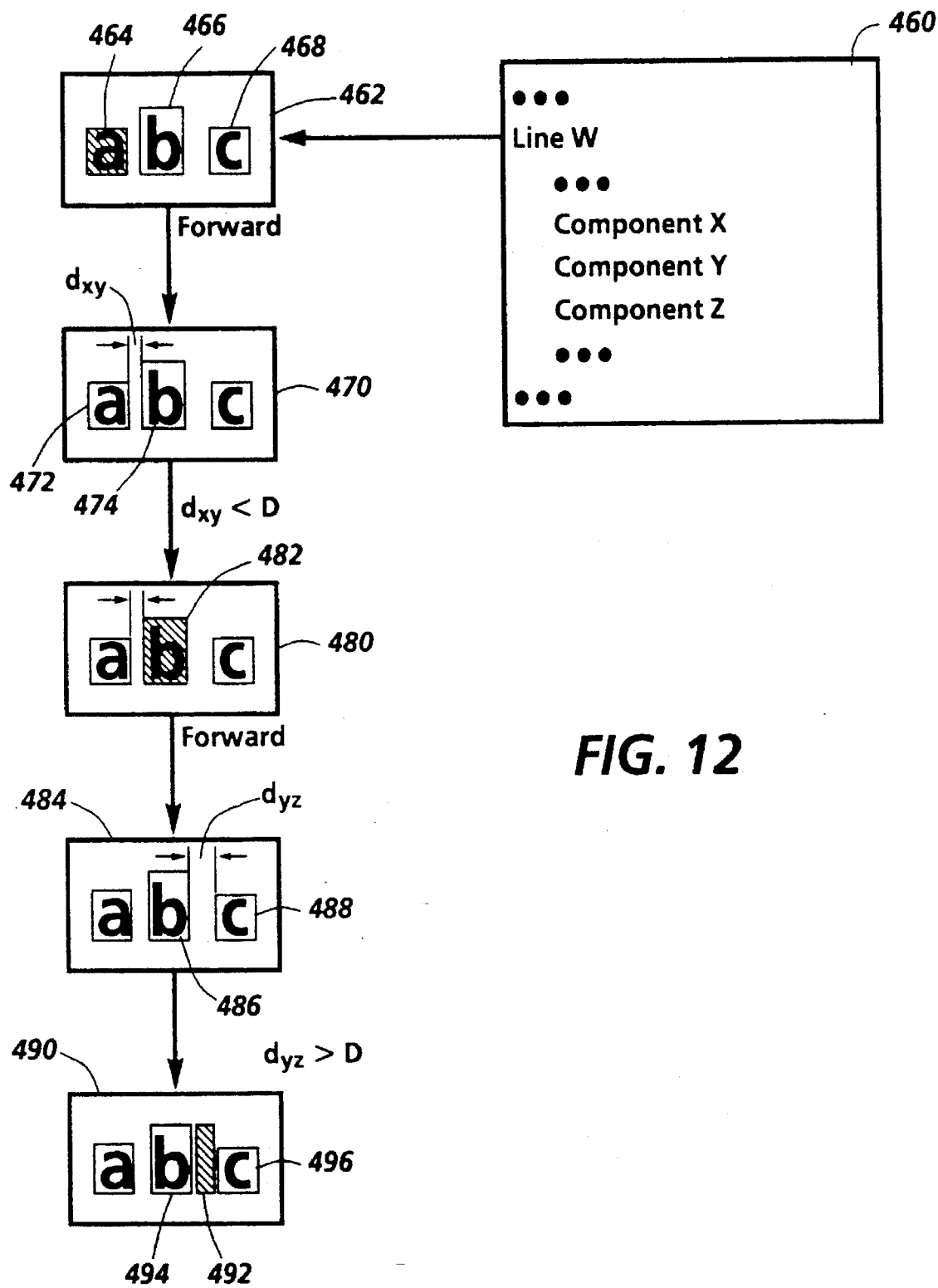
FIG. 12 is a flow chart illustrating steps in cursor positioning on a space between words.
Figure 13:
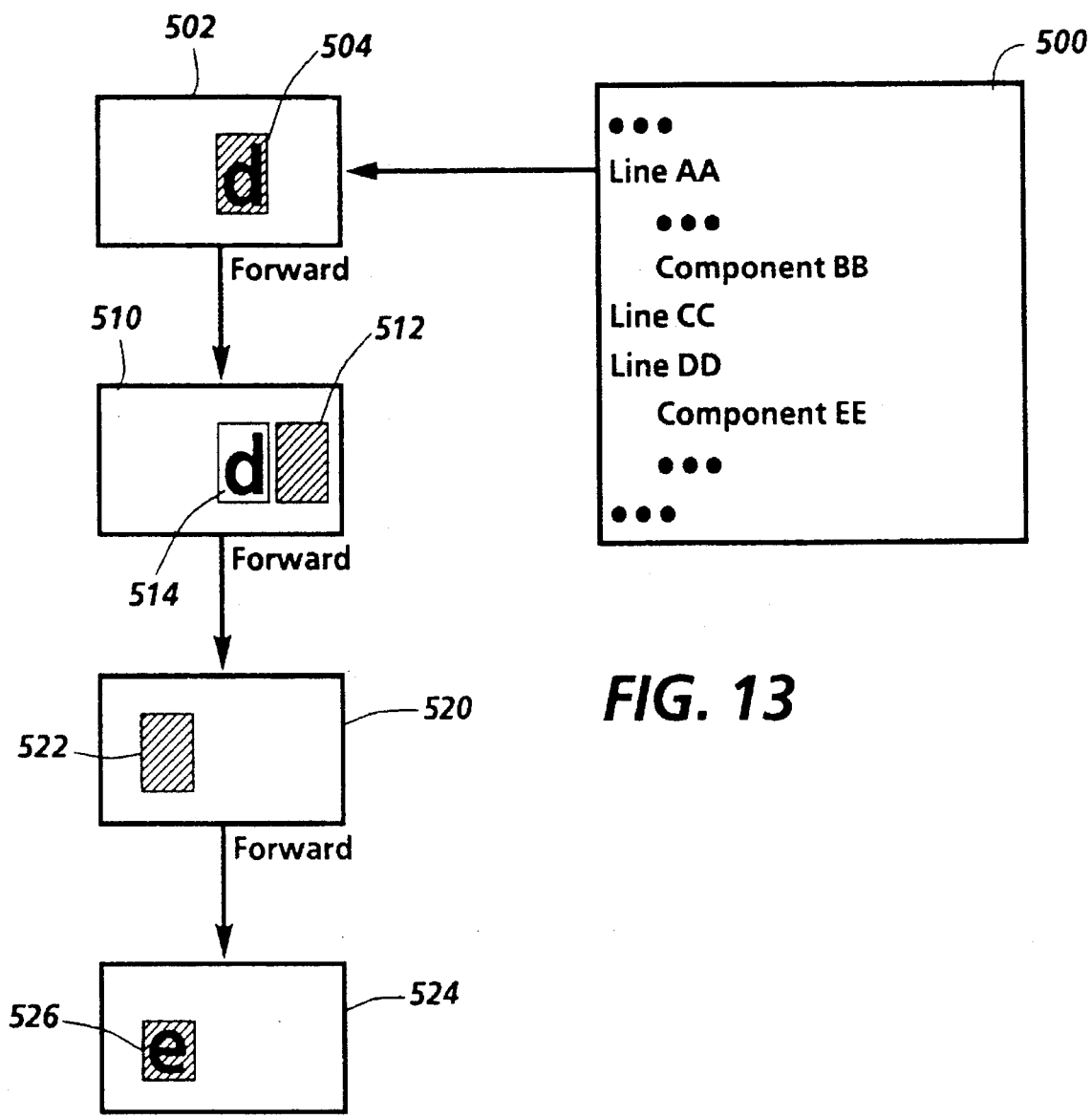
FIG. 13 is a flow chart illustrating steps in cursor positioning on a carriage return.

FIG. 12 illustrates cursor positioning on a space between words. FIG. 13 illustrates cursor positioning on a carriage return.

The fragment of parsed image data structure shown in box 460 in FIG. 12 includes part of a line data unit W that includes component data units X, Y, and Z. Arrays 462, 470, 480, 484, and 490 each include three bitmap arrays respectively defined by component data units X, Y, and Z. Each bitmap array is a version of the raster bitmap of the respective component data unit and is positioned in accordance with the coordinates of the respective component data unit.

Array 462 thus includes bitmap arrays 464, 466, and 468. Bitmap array 464, which includes the letter "a", is a version of the raster bitmap of component data unit X, and is shown shaded to indicate that it is the currently active cursor position. Bitmap arrays 466 and 468, respectively including the letters "b" and "c", are versions respectively of the raster bitmaps of component data units Y and Z, and are not shaded. The spacing between bitmap arrays 464 and 466 is smaller than that between bitmap arrays 466 and 468, as a result of the coordinates from component data units X, Y, and Z. This difference in spacing may be because bitmap arrays 464 and 466 are part of a different word than bitmap array 468.

If the user provides a signal requesting an operation that includes moving the currently active cursor position forward to the next position, the processor can perform the step illustrated by array 470. Using the coordinates from component data units X and Y, the processor can determine the spacing $d_{XY}$ between bitmap arrays 472 and 474. If the coordinates are measured in pixels, $d_{XY}$ can be measured in columns of pixels. The spacing $d_{XY}$ can then be compared with a threshold value D to determine whether the spacing between bitmap arrays 472 and 474 is large enough to be an interword space. Upon determining that $d_{XY}$ is smaller than D, as shown, the processor can provide array 480 in which bitmap array 482 is shaded to indicate that it is the currently active cursor position.

If the user again provides a signal requesting an operation that includes moving the currently active cursor position forward to the next position, the processor can perform the step illustrated by array 484. Using the coordinates from component data units Y and Z, the processor can determine the spacing $d_{YZ}$ between bitmap arrays 486 and 488. The spacing $d_{YZ}$ can then be compared with a threshold value D. Upon determining that $d_{YZ}$ is greater than D, as shown, meaning that this is an interword space, the processor can provide array 490 in which bitmap array 492, including all the rectangular area between bitmap arrays 494 and 496, is shaded to indicate that it is the currently active cursor position.

The steps illustrated in FIG. 12 could be performed, for example, in response to a sequence of user requests to advance the cursor position or in response to a sequence of requests to assign component arrays to keys. In general, when an array that does not include a connected component is assigned to the space bar, subsequent clicking of the space bar results in an adjustment of coordinates of subsequent component data units to leave a space as large as the array. The default space should be larger than the threshold value D.

The fragment of parsed image data structure shown in box 500 in FIG. 13 includes part of a line data unit AA that includes component data unit BB, which is the last subsidiary data unit in line data unit AA. Line data unit AA is then followed by line data units CC and DD, with line data unit CC being empty and line data unit DD beginning with component data unit EE. Arrays 502 and 510 are defined by line data unit AA and component data unit BB. Array 520 is defined by line data unit CC, and array 524 is defined by line data unit DD and component data unit EE. Each of the bitmap arrays that is defined by a respective component data unit is a version of the raster bitmap of the respective component data unit and is positioned in accordance with the coordinates of the respective component data unit.

Array 502 thus includes bitmap array 504, which includes the letter "d" and which is a version of the raster bitmap of component data unit BB. Bitmap array 504 is shown shaded to indicate that it is the currently active cursor position.

If the user provides a signal requesting an operation that includes moving the currently active cursor position forward to the next position, the processor can perform the step illustrated by array 510. Upon determining that component data unit BB is the last subsidiary data unit in line data unit AA, as shown, the processor can provide shaded bitmap array 512 to indicate that the currently active cursor position is the carriage return at the end of the line of text defined by line data unit AA. The dimensions of bitmap array 512 can be default values, and bitmap array 512 can be positioned immediately after bitmap array 514.

If the user again provides a signal requesting an operation that includes moving the currently active cursor position forward to the next position, the processor can perform the step illustrated by array 520. Upon determining that line data unit CC has no subsidiary data units, as shown, the processor can provide shaded bitmap array 522 to indicate that the currently active cursor position is a carriage return at the end of the empty line defined by line data unit CC. The dimensions of bitmap array 522 can be the same default values as for bitmap array 512, and bitmap array 522 can be positioned at the left coordinate position of line data unit AA.

If the user again provides a signal requesting an operation that includes moving the currently active cursor position forward to the next position, the processor can perform the step illustrated by array 524. Upon determining that line data unit DD includes, as its first subsidiary data unit, component data unit EE, as shown, the processor can provide shaded bitmap array 526 with the character "e" to indicate that the currently active cursor position is the first character of the line of text defined by line data unit DD.

The steps illustrated in FIG. 13 could be performed, for example, in response to a sequence of user requests to advance the cursor position, in response to a sequence of requests to assign component arrays to keys, or in response to a user request to search for a sequence of component arrays. In general, however, an attempt to assign an array to the carriage return key will be ignored. Clicking the carriage return key can always have the effect of inserting a new line data unit into the parsed image data structure immediately after the current line, and moving the currently active cursor position to the beginning of the new line, as in array 520. The position of the new line array and of subsequent line and v-block arrays can be determined from the previous differences between coordinates of line data units, with an attempt to keep lines of text evenly spaced.

Cursor positioning techniques resembling those illustrated in FIGS. 12 and 13 can be used to select a part of a text on which a text editing operation is to be performed. For example, an operation could be requested on the word that includes the currently active cursor position, in which case the processor could find the nearest interword spacing or end of line forward and backward from the currently active cursor position and perform the requested operation on the subsidiary data units between them. Similarly, an operation could be requested on the line that includes the currently active cursor position, in which case the processor could perform the requested operation on all the subsidiary data units in the line data unit. Or an operation could be requested on a sequence of text that begins on one line and extends to another line, in which case the user must indicate two cursor positions, one for the beginning and one for the end, and the processor can perform the requested operation on all of the subsidiary data units between the indicated cursor positions.

Figure 14:
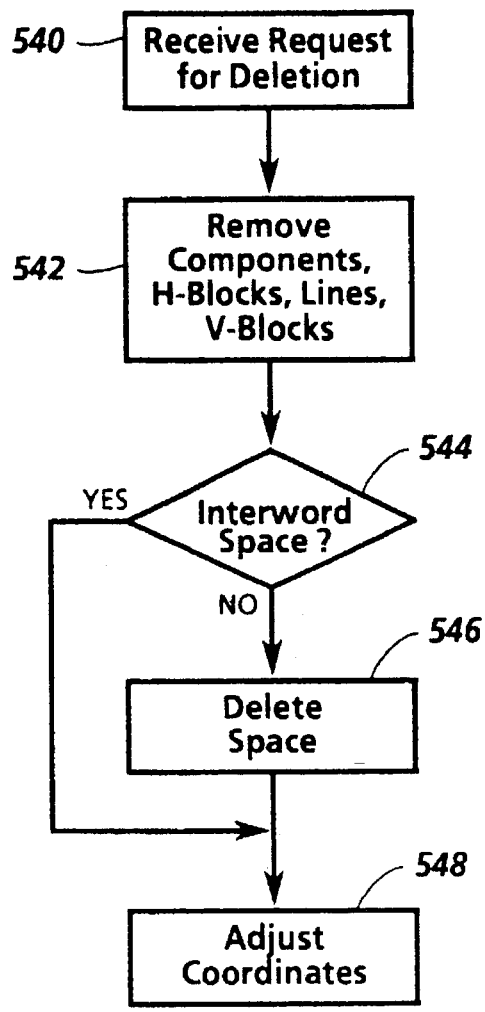
FIG. 14 is a flow chart showing steps in making a deletion.
Figure 15:
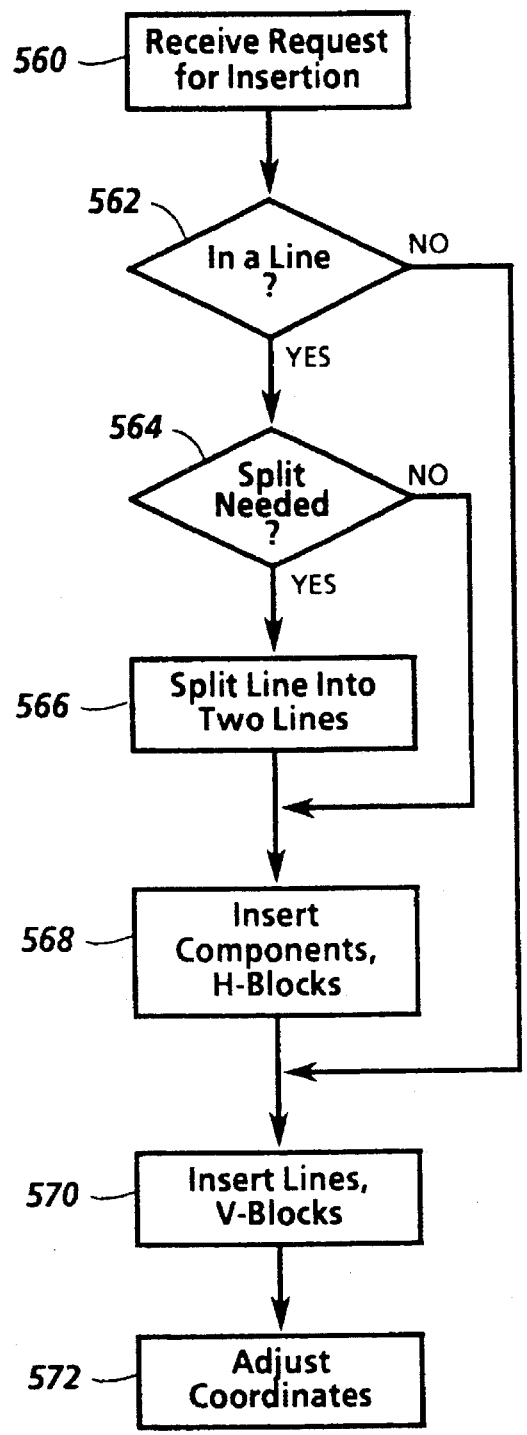
FIG. 15 is a flow chart showing steps in making an insertion.
Figure 16A:
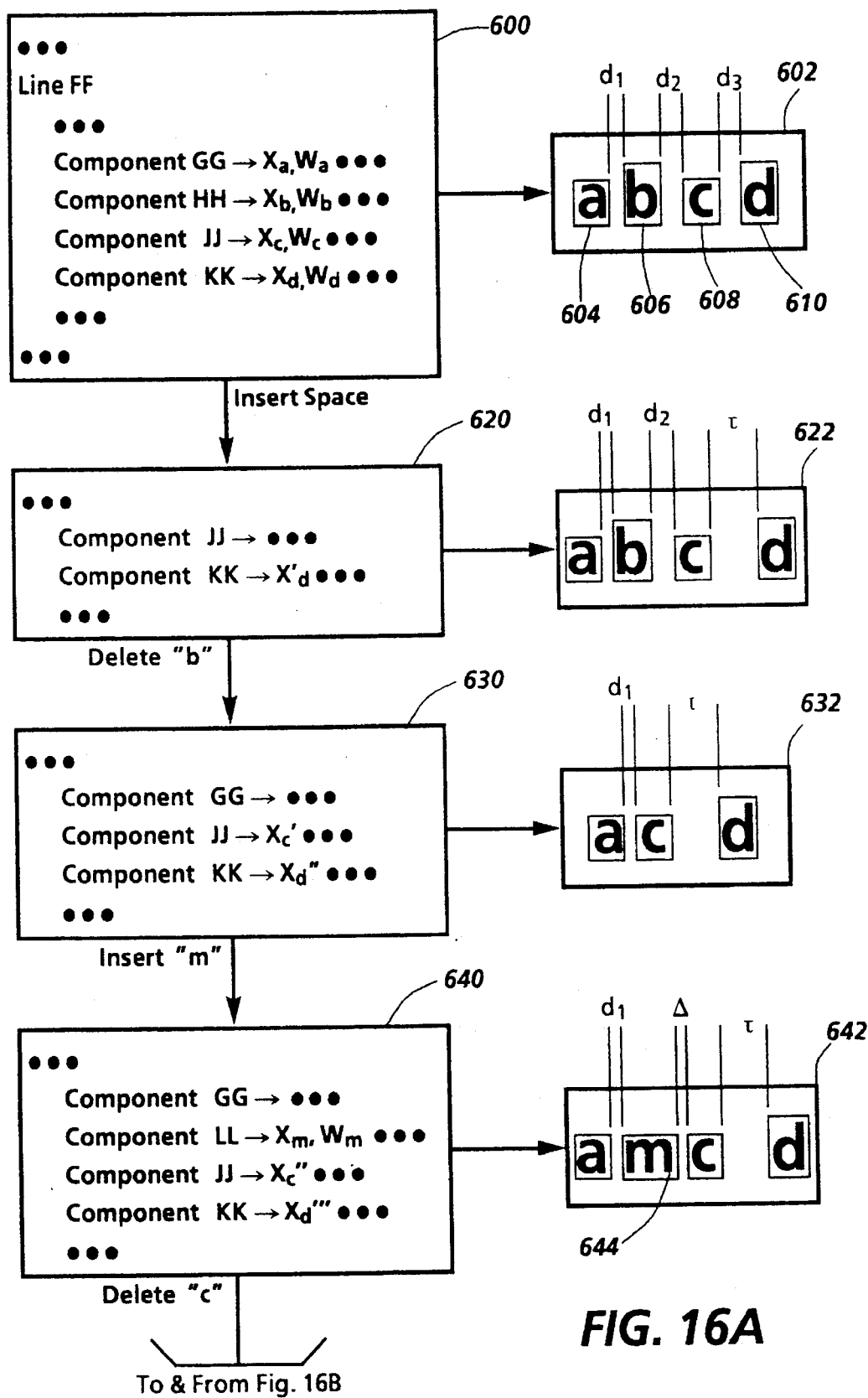
FIGS. 16A and 16B are a flow chart illustrating steps in performing a series of insertions and deletions.
Figure 16B:
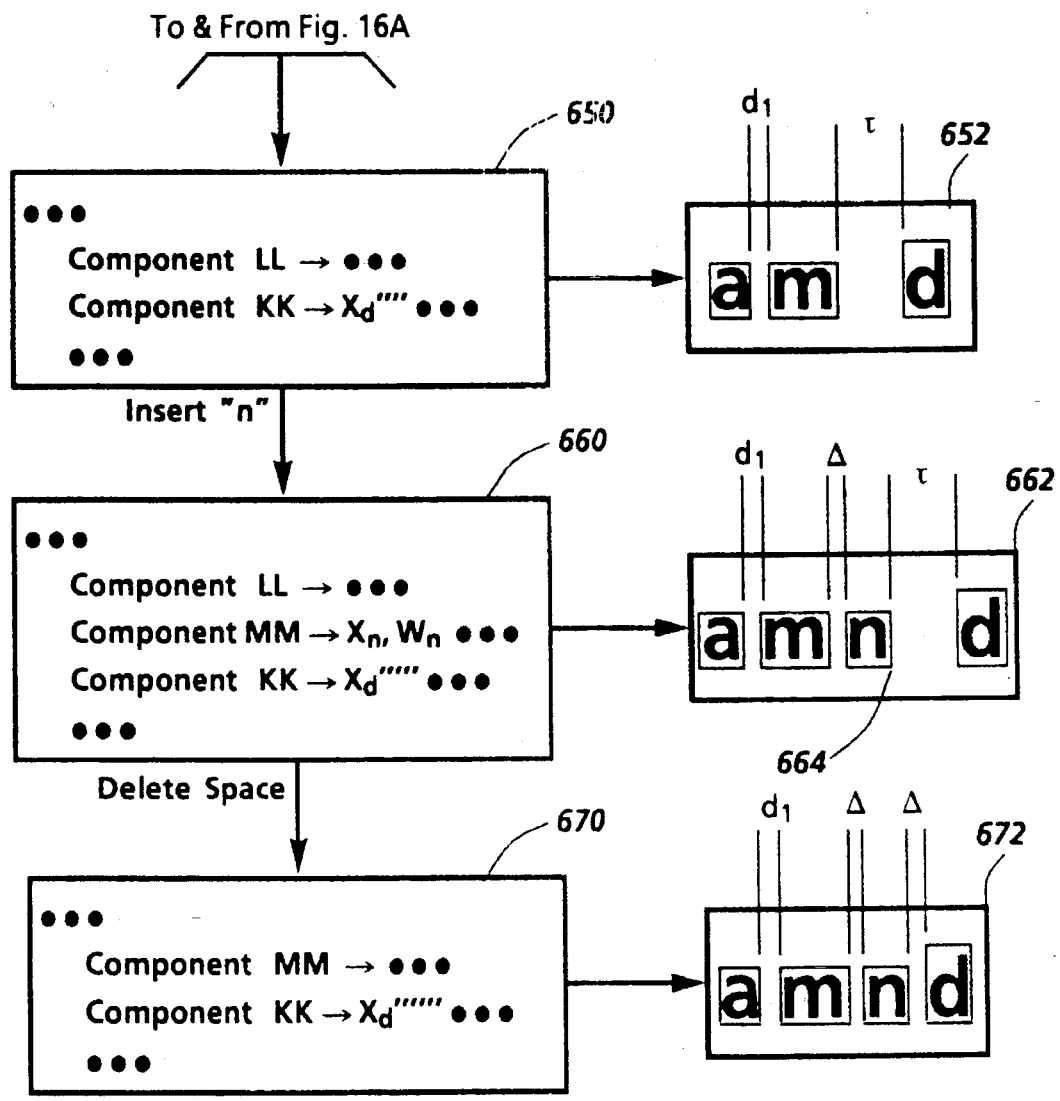
Figure 17:
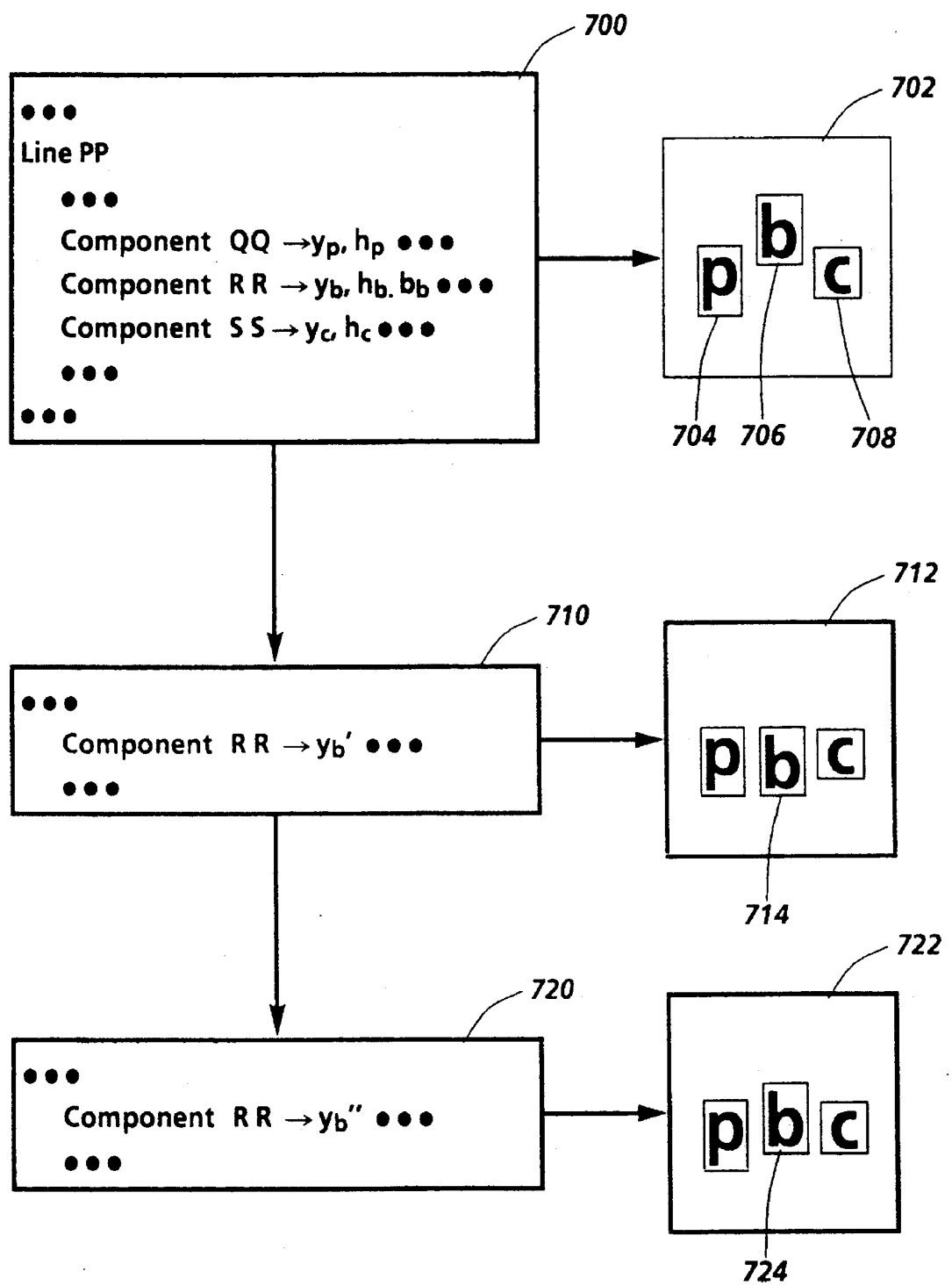
FIG. 17 is a flow chart illustrating steps in transverse positioning.
Figure 18:
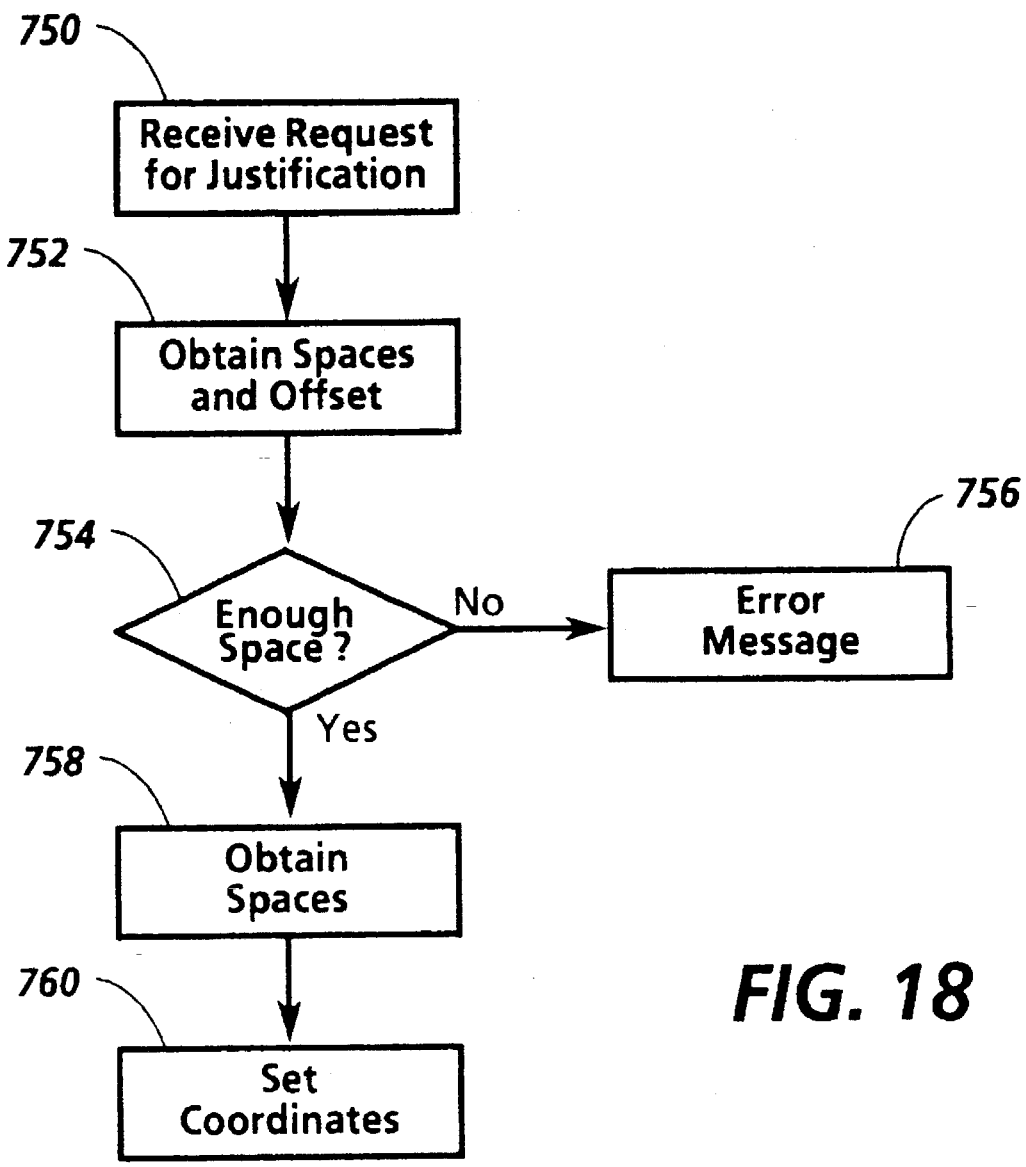
FIG. 18 is a flow chart showing steps in justification.

Search operations can also take into account spaces and carriage returns. The user can provide a sequence of arrays in a search request, and the processor can scan the parsed image data structure to find a sequence of matching arrays. If the user indicates the occurrence of a space in the search request, the space can be matched by any space between component arrays larger than the interword threshold or by an end of line, and the search can then continue to match subsequent characters in the search request.

b. Insertion, Deletion, and Positioning. A typical text editing operation can be executed by performing one or more deletions and insertions. When a data structure such as linked list 330 has been developed to include sufficient data, deletions and insertions can be performed by making relatively simple modifications of the data structure. FIG. 14 illustrates steps that can be used to make a deletion, and FIG. 15 illustrates steps that can be used to make an insertion. FIG. 16A and 16B illustrates adjustment of spacing between component arrays in a line. FIG. 17 illustrates adjustment of a character's position in a direction transverse to a line. FIG. 18 illustrates justification.

In the step in box 540 in FIG. 14, the processor receives a request for deletion of part of a text. This request can include an identifier of a delete operation together with data defining the part of the text to be deleted. In the text, the part to be deleted could, for example, be a character, a word, a line, or a sequence beginning on one text line and extending to another. Within the data structure, each of these parts of the text is defined by a respective set of subsidiary data units, possibly including component, h-block, line, and v-block data units, some of which may be obtained from larger arrays in response to the request in box 540. In each case, the step in box 542 accomplishes the deletion by removing the subsidiary data units defining the part of the text to be deleted.

After removal of the subsidiary data units, the test in box 544 determines whether the space preceding the deleted part is an interword space. This can be done, for example, by counting the blank columns of pixels and comparing the count with a threshold, as discussed above in relation to FIG. 12. If not an interword space, the preceding space is deleted, in box 546, by adjusting the coordinates of the component or h-block data unit that follows it.

Finally, the step in box 548 adjusts the coordinates of the other component, h-block, line, and v-block data units affected by the deletion, to adjust intercharacter, interword, and interline spacing. This can be done by scanning through the data structure and determining, for each component and h-block data unit, the x-coordinate that will provide an appropriate space between its respective array and the preceding component or h-block array. When a line data unit is completed, its subsidiary data units can be rejustified by adjusting the interword spacing as described below, which results in adjustment of the x-coordinates of component and h-block data units in the line data unit. The spacing of lines can be adjusted by determining, for each line or v-block data unit, the y-coordinate that will provide an appropriate space between its respective array and the preceding line or v-block array.

In the step in box 560 in FIG. 15, the processor similarly receives a request for an insertion into a text. This request can include an identifier of an insertion operation, an indication of the insertion position, and data defining the matter to be inserted, such as a data structure resembling linked list 330.

The test in box 562 determines whether the insertion position is within a line array, as opposed to between line arrays, and obtains smaller arrays as necessary to make that determination. If so, the test in box 564 determines whether the line array must be split to allow the insertion. Splitting may not be necessary if only one or a few component arrays are being added to the line array, as is typically the case during typing, for example. If a split is necessary, as it will be if another line array or a v-block array is being inserted in the middle of a line array, the respective line data unit is split into two line data units in box 566, with one including component and h-block data units prior to the insertion position and the other including component and h-block data units following the insertion position.

The step in box 568 then inserts component and h-block data units at the insertion position, by adding them to the appropriate line data unit. The step in box 570 then inserts line and v-block data units in the appropriate positions.

The step in box 572 adjusts the coordinates of subsidiary data units, including those inserted, as in box 548 in FIG. 14.

The steps in box 548 in FIG. 14 and box 572 in FIG. 15 may be implemented with positioning operations as illustrated in FIGS. 16A, 16B, and 17. FIGS. 16A and 16B illustrate a sequence of insert and delete operations that each involve adjustment of spacing between component arrays in a line array. FIG. 17 illustrates an insertion operation that involves adjustment in a direction transverse to a line of text.

The fragment of parsed image data structure in box 600 in FIG. 16A shows line data unit FF, defining partial line array 602 and including component data units GG, HH, JJ, and KK, which respectively define component arrays 604, 606, 608, and 610 in partial line array 602. As shown in box 600, each component data unit includes a respective x-coordinate and a width, represented in FIGS. 16A and 16B by $x_n$ and $w_n$ where n is the character appearing in the respective component array. The spacings between component arrays, shown as $d_1$, $d_2$, and $d_3$, are implicit in the x-coordinates and widths. For example, $d_1=x_b-(x_a+w_a)$, and so forth.

The first operation shown in FIG. 16A is to insert a space between the component arrays that include the characters "c" and "d". This is done by changing the x-coordinate of component data unit KK from $x_d$ to $x_d'$ as shown in the fragment in box 620 and by changing the x-coordinates of the subsequent component and h-block data units in line data unit FF by an equivalent amount. The change to be made depends on the size of space $\tau$ that has been assigned to the space bar and on the size of $d_3$. In the case where $d_3$ is less than D, the threshold interword space, $\tau$ replaces $d_3$, as shown in partial line array 622. Therefore, the new x-coordinate $x_d'$ and displacement $D_1$ are then $x_d'=x_d-d_3+\tau$ and $D_1=(x_d'-x_d)=\tau-d_3$, and this displacement can then be applied to the subsequent data units in line data unit FF. If $d_3$ were greater than D, on the other hand, $\tau$ could simply be added to $d_3$ so that $x_d'=x_d+\tau$ and $D_1=(x_d'-x_d)=\tau$.

The next operation is to delete the component array that includes the character "b", an array that is spaced from the two adjacent component arrays by less than D. As shown in the fragment in box 630, this is done by removing component data unit HH and by changing the x-coordinates of subsequent data units in line data unit FF. For example, the x-coordinates of the first subsequent data unit can be changed so that it begins at the same point the deleted component data unit began, as shown in partial image fragment 632. The new x-coordinate $x_c'$ and displacement $D_2$ can thus be calculated as $x_c'=x_b=x_c-d_2-w_b$ and $D_2=(x_c'-x_c)=-(d_2+w_b)$, and this displacement can then be applied to the subsequent data units in line data unit FF. Substantially the same technique could be used to delete a component array that is spaced from the preceding component array by more than D and from the following component array by less than D.

The next operation is to insert a component array that includes the character "m" between the component arrays that include the characters "a" and "c". As shown in the fragment in box 640, this is done by including component data unit LL. Component data unit LL, as shown in partial line array 642, defines component array 644. Spacing $d_1$ can be kept between component array 644 and the preceding component array, and a default spacing $\Delta$ can be inserted between component array 644 and the following component array, as shown in partial line array 642. The new x-coordinates $x_m$ and $x_c''$ and displacement $D_3$ are then $x_m=x_c'$, $x_c''=x_m+\Delta=x_c'+\Delta+w_m$, and $D_3=(x_c''-x_c')=w_m+\Delta$. $\Delta$ could, for example, be two columns of pixels in width.

The next operation is to delete the component array that includes the character "c", an array that is spaced from the preceding component array by less than D and from the following component array by more than D. As shown in the fragment in box 650, this is done by removing component data unit JJ and by changing the x-coordinates of subsequent data units in line data unit FF. For example, the x-coordinate of the first subsequent data unit can be changed so that it begins at a point that is spaced from the preceding component array by the same spacing as it was previously spaced from the component array defined by the deleted component data unit, in this case $\tau$ as shown in partial image fragment 652. The new x-coordinate $x_d''''$ and displacement $D_4$ can thus be calculated as $x_d''''=x_d'''-w_c-\Delta$ and $D_4=(x_d''''-x_d''')=-(w_c+\Delta)$. Note that $\Delta$ should be replaced in these equations by whatever spacing existed between the deleted character and the preceding component array if it is a spacing other than $\Delta$.

The next operation is to insert a component array that includes the character "n" between the component arrays that include the characters "m" and "d", immediately after the "m" and prior to the space that is greater than D. As shown in the fragment in box 660, this is done by including component data unit MM. Component data unit MM, as shown in partial line array 662, defines component array 664. The default spacing $\Delta$ can be used prior to the inserted array and the spacing following the inserted array can be the same as the previous spacing, as shown in partial line array 662. The new x-coordinates $x_n$ and $x_d'''''$ and displacement $D_5$ can thus be calculated as $x_n=x_m+w_m+\Delta$, $x_d'''''=x_n+w_n+\tau=x_d''''+\Delta+w_n$, and $D_5=(x_d'''''-x_d'''')=w_n+\Delta$.

The final operation is to delete the space between the component arrays that include the characters "n" and "d", a space that is greater than D but, for illustrative purposes, less than 2D. As shown in the fragment in box 670, this is done by changing the x-coordinates of subsequent data units in line data unit FF. For example, the x-coordinate of the first subsequent data unit can be changed so that it begins at a point that is spaced from the preceding component array by the spacing $\Delta$, as shown in partial line array 672. The new x-coordinate $x_d''''''$ and displacement $D_6$ can thus be calculated as $x_d''''''=x_d'''''-\tau+\Delta$ and $D_6=(x_d''''''-x_d'''')=\Delta-\tau$. Note that $\tau$ should be replaced in these equations by whatever spacing existed between the component arrays adjoining the deleted space if it is a spacing other than $\tau$.

The steps shown in FIGS. 16A and 16B could be modified in a number of ways without changing the basic technique of using spatial information about component arrays to adjust spacing between component arrays in a line array.

After inserting a component array into a line of text, as in the steps shown in boxes 640 and 660 in FIGS. 16A and 16B, it is also appropriate to adjust the positioning of the inserted array in a direction transverse to the line of text so that the character it includes is appropriately aligned with the other characters in the line. FIG. 17 illustrates steps that could be taken in transversely positioning an inserted character. These steps could occur before or after spacing has been adjusted.

Each component data unit can include, in its coordinates, a slot for a baseline offset. If the baseline offset slot has a value in it, the value indicates the displacement of the component from a baseline of a word or line in which it occurs, and the value can be used in transverse positioning. If the baseline offset slot does not have a value or if its value produces an unsatisfactory result, other techniques are used. The baseline slot may have a value in cases where the component array comes from a stored font, for example.

The fragment of parsed image data structure shown in box 700 includes a newly inserted component data unit RR in line data unit PP, inserted between component data units QQ and SS. Component data units QQ, RR, and SS each include respective y-coordinates and heights. In addition, component data unit RR includes in its height above baseline slot a value $b_b$, indicating its height above a baseline.

Partial line array 702 illustrates the transverse positioning of component arrays 704, 706, and 708, the respective arrays of component data structures QQ, RR, and SS. Component array 704, which includes the character "p", and component array 708, which includes the character "c", are positioned such that $Y_p$ and $y_c$ are approximately equal. This is because the y-coordinates, measured from the upper left hand corner of the line array, indicate the upper left hand corner of each component array; since the upper left hand bounding box corners of "p" and "c" are at approximately the same level in a line of text, the y-coordinates of their component arrays are approximately the same. Newly inserted component array 706, however, is initially positioned above the usual position of the character "b" in a line of text, which can occur when $b_b$ is inaccurate.

The user, upon observing the inappropriate positioning of the character "b" as in partial line array 702, can request that other transverse positions be obtained and presented. These other positions could also be obtained in initially positioning a character where no baseline or baseline offset is provided, with the median of the positions obtained being initially presented. The other transverse positions could be based on the baselines or positions of neighboring characters. The user can then select one of the positions obtained.

The subsequent steps in FIG. 17 show two options for positioning the newly inserted component array. These two options are obtained by considering four possible transverse positions and eliminating redundancy. The four possible transverse positions are obtained by positioning the bottom of the character "b" at the bottom of "p"; positioning the bottom of "b" at the bottom of "c"; positioning the top of "b" at the top of "p"; and positioning the top of "b" at the top of "c". Of these positions, the first, third and fourth are the same, resulting in one option, while the second is different, resulting in the second option.

The fragment of parsed image data structure in box 710 illustrates the first option. Rather than yb as in box 700, its y-coordinate is $yb'=y_p+h_p-h_b$, so that in partial line array 712, component array 714 is aligned below the usual position of the character "b" in a line of text.

The fragment of parsed image data structure in box 720 illustrates the second option. The y-coordinate is $yb''=y_c+h_c-h_b$, so that in partial line array 722, component array 724 is aligned at approximately the usual position of the character "b" in a line of text.

The user can cycle through the options available to find the most appropriate one, which can then be selected as the transverse position of the inserted component array. This technique could be extended to consider a larger number of neighboring characters and to obtain options based on the baseline offsets of neighboring characters.

Adjusting coordinates can also include justification, which can be done by adjusting interword spacing. FIG. 18 illustrates steps by which justification can be performed based on the assumption that any space between arrays that is greater than or equal to D is an interword space.

In the step in box 750, the processor receives a request for justification of a line array. The request may include data indicating a right margin. In box 752, the processor analyzes the respective line data structure to obtain the information necessary for justification. Each space between adjacent component arrays is measured by taking the difference between the respective x-coordinates and subtracting from the difference the width of the preceding component array. Each space can then be compared with D to determine whether it is an interword space. If so, the following component data structure can be added to a list of component data structures that follow an interword space, together with data indicating the size of the space. Also, the offset between the right margin and the right side of the last component array is obtained, using the x-coordinate and width of the last component data structure.

The step in box 754 calculates the excess interword space and determines whether it is greater than the offset between the right margin and the right side of the last component array. If not, the line is too long to be justified, so the step in box 756 provides an error message. If N is the number of interword spaces and D is the threshold interword space, the excess interword space can be calculated by totalling the interword spaces and then subtracting (N×D), which is the smallest possible amount of interword space.

If the line is not too long to be justified, the step in box 758 obtains the lengths of the interword spaces necessary to justify the line data structure by spreading the excess interword space equally among the interword spaces. Then, in box 760, the coordinates of the component data units on the line are set to provide the interword space lengths obtained in box 758, completing justification.

The technique in FIG. 18 could be elaborated to allow for movement of words between lines. For example, a test could be performed to determine whether the interword spacing will be too large if the line data structure is justified. This could be determined, for example, by adding the offset to the total interword spacing and dividing by the number of interword spaces, N; if the result exceeds 2D or some other appropriate threshold, there is too much space to justify the line. In that case, a word from a following line could be added if the following line is in the same paragraph and if the word is not so long that it will make the line too long to justify. Similarly, if the line is too long, words could be moved to the next line until it is short enough to be justified. A test could also be performed to determine whether the line is the last in a paragraph, in which case it would not be justified but would have its interword spaces set at a default value such as D.

The features described above could be provided through software executed by a data processing system.

D. Source Code Microfiche Appendix

Microfiche Appendix A is a Lisp source code listing, execution of which provides features similar to those discussed above. This code can be executed on a Symbolics XL400 workstation or any other Symbolics machine running Genera 7.2 or a later version of Symbolics Lisp.

The code in Microfiche Appendix A begins with a binary form of an image. This binary form is obtained by a call to a function Read-AIS-File, which converts between an image source and the binary form of the image. The image source could be a scanner, a facsimile receiver, a memory file, or any other appropriate source, and the Read-AIS-File can convert in a straightforward manner from the image source format to the binary form. Another function Write-MS-File can convert from the binary form to the image source format when necessary.

Image quality will affect the performance of the code in Microfiche Appendix A. The code has difficulty separating lines in an image in which a line of text is not separated from adjacent lines by a blank row of pixels; deskewing the image may therefore improve performance. The code similarly has difficulty separating characters that are joined to their neighbors and grouping the pieces of a broken character into a component set, so that a good quality, high resolution image will be easier to edit with the code.

The code in Microfiche Appendix A follows the editing model of EMACS, a text editor available with source code from Free Software Foundation, Cambridge, Mass., and which is described in Stallman, R., *GNU Emacs Manual*, Sixth Edition, Free Software Foundation, Cambridge, Mass., March 1987, which is incorporated herein by reference. In EMACS, a cursor is displayed by blinking a bounding box of a character, with the currently active location being between the blinking character and the preceding character. EMACS editing commands include, for example, commands that move the cursor; commands to insert or delete at the currently active location; commands to operate on the line of text that includes the currently active location; commands to operate on a region of text that begins on one line and ends on another, which is specified by the currently active location and another active location; and commands to search for a sequence of characters.

The code in Microfiche Appendix A obtains smaller arrays from unparsed arrays of an image as necessary for an editing operation. Because the starting position of the EMACS cursor is on the uppermost and leftmost character of a text, the code will have difficulty with a document in which the uppermost and leftmost connected component is something much larger than a character, such as a graphical object; this can be avoided by using the code only on documents that do not have such connected components before the first line of text or by enabling the user to select for editing a text-only subregion of an image.

The files in Microfiche Appendix A contain the following described contents:

BD:>parc>local-hacks>raster includes a number of raster bitmap manipulation functions that are called elsewhere in the code.

BARNABY:>editor>baseline includes functions for computing baseline of a character-size array.

BARNABY:>editor>buffer includes functions for operating on buffer data structures, described below.

BARNABY:>editor>command-tables includes functions that define commands and store them in command tables. These tables are used for mapping from input signals such as typed keyboard keys to functions.

BARNABY:>editor>commands includes a set of definitions of commands and a function that installs the commands to allow mapping from keys of a keyboard to commands.

BARNABY:>editor>convolve includes functions that perform matching during a search.

BARNABY:>editor>coordinates includes functions that scale and manipulate coordinates, such as from a binary form of an image to screen coordinates.

BARNABY:>editor>cursor includes functions that operate on cursor data structures, described below. These functions include functions to set up a currently active position, such as between character-size arrays, at the end of a line, or at the end of an empty line.

BARNABY:>editor>defs includes definitions of a number of data structures, including buffer data structures and cursor data structures. A buffer can be a parsed image data structure holding the current definition of the image being viewed. A cursor is a data structure that indicates a location in the buffer with coordinates, and can be used to indicate currently active positions and other positions, as may be necessary for passing a position between functions.

BARNABY:>editor>display includes display functions. EDIT, the last function in this file, is the top level function of the code in Appendix A.

BARNABY:>editor>fill includes functions that fill lines for rejustification and so forth.

BARNABY:>editor>frame includes functions that provide an interface to the Symbolics window system.

BARNABY:>editor>globals includes definitions of global variables. Among the variables defined are the redisplay levels indicating how much of the display must be updated.

BARNABY:>editor>image-proc includes functions that find connected components. FIND-CHAR-POSITIONS-IN-ARRAY, a function in this file, applies the rules to determine which connected components form a component set that is likely to be a character.

BARNABY:>editor>insert-delete includes functions that insert and delete character-size arrays by modifying the buffer.

BARNABY:>editor>intervals includes functions that operate on the arrays between two positions in the buffer, each indicated by a cursor. EMACS commands can be divided into those that operate on a specific type, such as a character, a word, or a line, on the one hand, and those that can operate on more than one type at a time. When the user indicates an interval or region by indicating its beginning and ending, an operation can be performed on the region. The functions in this file manipulate regions.

BARNABY:>editor>keyboard-macros includes functions for defining and using keyboard macros.

BARNABY:>editor>key-bindings includes functions for binding arrays to keyboard keys, and for displaying the current bindings.

BARNABY:>editor>line-spacing includes functions for adjusting the spacing between lines of text.

BARNABY:>editor>macros includes a few simple macros.

BARNABY:>editor>modes includes functions relating to buffer modes.

BARNABY:>editor>movement includes functions that move a cursor. FORWARD-CHAR, the fourth function in this file, for example, moves a cursor forward a specified number of characters, in the process finding interword spaces and ends of lines.

BARNABY:>editor>parse-image includes functions that divide unparsed arrays.

BARNABY:>editor>scale-bitmaps includes functions that shrink raster bitmaps by integral multiples of two.

BARNABY:>editor>scrolling includes functions for scrolling the displayed view and for moving the displayed view to include the currently active position.

BARNABY:>editor>search includes functions for searching for a character or sequence of characters. These functions provide substantially the same search interface as EMACS. The search itself, however, is performed by matching the stored array bound to each typed key with the next array in the data array being searched, dividing unparsed arrays as necessary. A typed space matches any space that is greater than or equal to the interword space threshold and also matches an end of line, while a carriage return only matches an end of line.

BARNABY:>editor>utilities includes miscellaneous items, including functions for object positioning.

E. Miscellaneous

The invention could be implemented in many other ways, in addition to those described above. For example, it might be implemented with an existing editor by adding functions for handling image objects from a raster bitmap.

The invention has been described in terms of dividing unparsed arrays of an image as necessary. Some aspects of the invention, however, might instead be implemented by dividing an entire image prior to editing or by dividing a part of an image whenever a position within that part is indicated, whether or not necessary. In any of these cases, specialized hardware might be used to perform specific functions, such as finding connected components.

Certain functions described above might be implemented in various ways. For example, segmentation of lines of text and of characters might be done with tests other than blank rows or columns of pixels, to allow for overlapping lines and touching characters. Similarly, connected components might be grouped into sets using more complex rules, and overlapping bounding boxes might be modified to eliminate overlap. Positioning of character-size arrays might consider more neighboring character-size arrays or might apply different rules to spacing and transverse positioning of character-size arrays.

As noted above, the invention might be used with data from any source of a two-dimensional data array defining an image, including scanners, memory, and so forth. Similarly, the invention might be used with any output device that can present a view of an image, including displays, printers, and so forth.

The invention might be used with the techniques described in coassigned copending U.S. Patent Application No. 07/459,026, now issued as U.S. Pat. No. 5,167,016, entitled "Changing Characters in an Image," and incorporated herein by reference.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a processor, the processor being connected for accessing an edit data structure, the edit data structure including a first two-dimensional array of data that defines a region of an image, the region including two or more elements in a first line, the elements including a first element; the processor further being connected for receiving requests for text editing operations; the method comprising the steps of:

receiving a request for a character level text editing operation affecting the first element;

in response to the request, accessing the edit data structure to perform the character level text editing operation, the step of accessing the edit data structure to perform the operation comprising the substeps of:

accessing the first two-dimensional array of data;

obtaining a second two-dimensional array of data from the first two-dimensional array, the second two-dimensional array defining the first element and not defining any of the elements other than the first element; and performing the operation using the second two-dimensional array.

2. The method of claim 1 in which, before the performing substep, the edit data structure defines a first version of the image, and, after the performing substep, the edit data structure defines a second version of the image; the processor further being connected for providing views of the image for presentation by an image output device; the method further comprising accessing the edit data structure before the performing substep to provide a view of the first version of the image for presentation by the image output device and accessing the edit data structure after the performing substep to provide a view of the second version of the image for presentation by the image output device.

3. The method of claim 2 in which the image output device has a display, the image output device presenting the views provided by the processor on the display, the processor being further connected for receiving the request from a user input device, the user input device including a pointer control device for providing signals indicating positioning of a pointer on the display, the view of the first version including the line of elements, the step of receiving the request comprising receiving a signal from the pointer control device indicating positioning of the pointer within the line of elements.

4. The method of claim 1 in which the elements are characters, the image including text.

5. The method of claim 1 in which the request for the text editing operation includes an indication of a position within the region of the image, the second two-dimensional array defining a subregion of the image that is within the region and that includes the indicated position.

6. The method of claim 1 in which the substep of obtaining the second two-dimensional array comprises the substep of obtaining spatial data indicating spatial information about the first element, the step of performing the text editing operation comprising including the spatial data in the edit data structure.

7. The method of claim 1 in which the substep of obtaining the second two-dimensional array comprises the substep of finding a set of at least one connected component within the first two-dimensional array, the second two-dimensional array including the set of at least one connected component, the set of at least one connected component forming the first element.

8. The method of claim 1 in which the substep of performing the operation comprises including the second two-dimensional array in the edit data structure.

9. The method of claim 8 in which the second two-dimensional array is included in the edit data structure in a first sequence of two-dimensional arrays, the two-dimensional arrays defining the elements in the first line, the first sequence of two-dimensional arrays including an adjacent array next to the second array in the sequence, the substep of performing the operation comprising operating on a set of two-dimensional arrays that define a sequence of the elements in the first line, the set of arrays including the second array and the adjacent array.

10. The method of claim 9 in which the elements in the line are characters and the sequence of the elements is a word.

11. The method of claim 9 in which the sequence of the elements includes all the elements in the first line.

12. The method of claim 8 in which the image further includes a second line of elements adjacent to the first line, the edit data structure further including a second sequence of two-dimensional arrays defining the elements in the second line, the substep of performing the operation further comprising operating on a set of two-dimensional arrays that define a sequence of the elements that begins on one of the first and second lines and that ends on the other of the first and second lines, the set of arrays including the second array and one of the arrays in the second sequence.

13. The method of claim 1 in which the processor is further connected for accessing an image data structure, the image data structure including an initial two-dimensional array of data that defines the image, the method further comprising:

accessing the image data structure; and using the initial two-dimensional array to obtain the first two-dimensional array.

14. The method of claim 13 in which the processor is further connected for receiving signals from an image input device, the method further comprising receiving a signal defining the image from the image input device and producing the initial two-dimensional array from the signal.

15. The method of claim 14 in which the image input device is a scanner.

16. The method of claim 1 in which the first two-dimensional array is a binary array.

17. The method of claim 1 in which the step of accessing the edit data structure to perform the operation does not include recognizing any of the elements in the line.

18. A method of operating a processor, the processor being connected for accessing an edit data structure, the edit data structure including a first array data unit defining a first two-dimensional array of data that defines a region of an image, the region including two or more elements in a first line including a first element; the processor further being connected for receiving requests for text editing operations; the method comprising the steps of:

receiving a first request for a first character level text editing operation on the image;

in response to the first request, accessing the edit data structure to perform the first text editing operation, the step of accessing the edit data structure to perform the first text editing operation comprising the substeps of:

using the first array data unit to obtain the first two-dimensional array;

obtaining first element spatial data from the first two-dimensional array, the first element spatial data indicating spatial information about the first element; and performing the first text editing operation using the first element spatial data.

19. The method of claim 18, in which the performing substep further comprises the substep of including the first element spatial data in the edit data structure.

20. The method of claim 18 in which the elements are characters, the image including text.

21. The method of claim 18 in which the substep of obtaining the first element spatial data does not include recognizing the first element.

22. A method of operating a processor, the processor being connected for accessing an edit data structure defining a version of an image, the edit data structure including a first array data unit defining a first two-dimensional array of data that defines a region of an image, the region including two or more elements in a first line including a first element; the processor further being connected for receiving requests for text editing operations; the processor further being connected for providing views of the image for presentation by an image output device and for receiving the first request from a user input device, the image output device having a display, the user input device including a pointer control device for providing signals indicating positioning of a pointer on the display;

the method comprising:

accessing the edit data structure to provide a view of the version of the image for presentation by the image output device, the image output device presenting the view on the display, the view including the first line;

receiving a first request for a first character level text editing operation on the image; the act of receiving the first request comprising receiving a signal from the pointer control device indicating positioning of the pointer within the first element;

in response to the first request, accessing the edit data structure to perform the first text editing operation, the act of accessing the edit data structure to perform the first text editing operation comprising:

using the first array data unit to obtain the first two-dimensional array;

obtaining first element spatial data from the first two-dimensional array, the first element spatial data indicating spatial information about the first element; and performing the first text editing operation using the first element spatial data.

23. A method of operating a processor, the processor being connected for accessing an edit data structure, the edit data structure including a first array data unit defining a first two-dimensional array of data that defines a region of an image, the region including two or more elements in a first line including a first element; the first element having a size, a shape, and a position; the processor further being connected for receiving requests for text editing operations;

the method comprising:

receiving a first request for a first character level text editing operation on the image;

in response to the first request, accessing the edit data structure to perform the first text editing operation, the act of accessing the edit data structure to perform the first text editing operation comprising:

using the first array data unit to obtain the first two-dimensional array;

obtaining first element spatial data from the first two-dimensional array, the first element spatial data indicating spatial information about the first element; the spatial information being about at least one of the size, the shape, or the position of the first element; and performing the first text editing operation using the first element spatial data.

24. A method of operating a processor, the processor being connected for accessing an edit data structure, the edit data structure including a first array data unit defining a first two-dimensional array of data that defines a region of an image, the region including two or more elements in a first line including a first element; the processor further being connected for receiving requests for text editing operations;

the method comprising:

receiving a first request for a first character level text editing operation on the image;

in response to the first request, accessing the edit data structure to perform the first text editing operation, the act of accessing the edit data structure to perform the first text editing operation comprising:

using the first array data unit to obtain the first two-dimensional array;

obtaining first element spatial data and a second two-dimensional array from the first two-dimensional array, the first element spatial data indicating spatial information about the first element, the second two-dimensional array defining the first element and not defining any of the elements other than the first element; the first element spatial data indicating spatial information about the second two-dimensional array; and performing the first text editing operation using the first element spatial data.

25. The method of claim 24 in which the act of obtaining first element spatial data and the second two-dimensional array comprises:

obtaining connected component data defining a set of at least one connected component within the first two-dimensional array, the second two-dimensional array defining a region that includes the set of at least one connected component, the set of at least one connected component forming the first element; and obtaining the first element spatial data from the connected component data.

26. The method of claim 24 in which the act of performing the first text editing operation comprises including the second two-dimensional array and the first element spatial data in the edit data structure.

27. The method of claim 26, further comprising:

receiving a second request for a second text editing operation on the image;

in response to the second request, accessing the first element spatial data in the edit data structure; and performing the second text editing operation using the first element spatial data.

28. The method of claim 24 in which the first text editing operation includes inserting a second element in the image, the second element being defined by a third two-dimensional array, the act of performing the first text editing operation comprising:

using the first element spatial data to obtain second element spatial data indicating spatial information about the second element.

29. The method of claim 28 in which the second element is a copy of the first element.

30. The method of claim 28 in which the first text editing operation includes inserting the second element in the first line adjacent to the first element, the first element spatial data including first element transverse positioning data indicating a position of the second two-dimensional array in a direction transverse to the first line, the act of using the first element spatial data comprising:

using the first element transverse positioning data to obtain second element transverse positioning data indicating a position of the third two-dimensional array in the transverse direction.

31. The method of claim 28 in which the first text editing operation includes inserting the second element in the first line following the first element, the first element spatial data including first element width data indicating a width of the second two-dimensional array and first element line positioning data indicating a position of the second two-dimensional array in a direction along the first line, the act of using the first element spatial data comprising:

using the first element width data and the first element line positioning data to obtain second element line positioning data indicating a position of the third two-dimensional array in the direction along the first line.

32. The method of claim 31 in which the act of using the first element spatial data further comprises:

adding the width indicated by the first element width data and an intercharacter space width to the position indicated by the first element line positioning data to obtain the second element line positioning data.

33. The method of claim 31 in which the image further includes a third element following the second element in the first line, the edit data structure further including a fourth two-dimensional array defining the third element and third element line positioning data indicating a position of the fourth two-dimensional array in the direction along the first line; the act of performing the first text editing operation further comprising:

modifying the third element line positioning data.

34. The method of claim 24 in which the image further includes a second element following the first element in the first line and a third element following the second element in the first line, the edit data structure further including a third two-dimensional array defining the third element, the edit data structure further including third element line positioning data indicating a position of the third two-dimensional array in a direction along the first line, the first text editing operation including deleting the second element from the image, the act of performing the first text editing operation comprising:

modifying the third element line positioning data using the first element spatial data.

35. The method of claim 34 in which the edit data structure further includes a fourth two-dimensional array defining the second element, the edit data structure further including second element spatial data indicating spatial information about the fourth two-dimensional array, the act of performing the first text editing operation further comprising:

using the second element spatial data to determine whether a space between the second element and the third element exceeds an interword space threshold; if so, the act of modifying the third element line positioning data comprising modifying the third element line positioning data so that the first element and the third element are spaced apart by an interword space width, the interword space width exceeding the interword space threshold.

36. The method of claim 24 in which the first line includes a second element following the first element; the edit data structure further comprising a third two-dimensional array defining the second element and second element spatial data indicating spatial information about the third two-dimensional array; the first text editing operation including inserting an interword space between the first and second elements; the act of performing the first text editing operation comprising:

modifying the second element spatial data using the first element spatial data so that the interword space is inserted.

37. The method of claim 24 in which the first line includes a second element following the first element and an interword space between the first and second elements; the edit data structure further comprising a third two-dimensional array defining the second element and second element spatial data indicating spatial information about the third two-dimensional array; the first text editing operation including deleting the interword space between the first and second elements; the act of performing the first text editing operation comprising:

modifying the second element spatial data using the first element spatial data so that the interword space is deleted.

38. The method of claim 24 in which the first line includes a second element following the first element; the edit data structure further comprising a third two-dimensional array defining the second element and second element spatial data indicating spatial information about the third two-dimensional array; the first text editing operation including advancing a cursor forward from the first element; the act of performing the first text editing operation comprising:

determining from the first element spatial data and the second element spatial data whether the first line includes an interword space between the first and second elements; and if so, advancing the cursor to the interword space.

39. The method of claim 24 in which the first element ends the first line; the first text editing operation including advancing a cursor forward from the first element; the act of performing the first text editing operation comprising:

using the first element spatial data to obtain a cursor position following the first element.

40. The method of claim 24 in which the first line includes a second element following the first element and an interword space between the first element and the second element; the edit data structure further comprising a third two-dimensional array defining the second element and second element spatial data indicating spatial information about the third two-dimensional array; the first text editing operation including justifying the first line; the act of performing the first text editing operation comprising:

using the first element spatial data and the second element spatial data to determine whether to adjust the interword space.

41. A method of operating a processor, the processor being connected for accessing an edit data structure, the edit data structure including a first array data unit defining a first two-dimensional array of data that defines a region of an image, the region including a text that includes first and second characters; the processor further being connected for receiving requests for text editing operations; the method comprising the steps of:

receiving a first request for a first text editing operation on the text, the first text editing operation affecting the first character;

in response to the request, accessing the edit data structure to perform the first text editing operation, the step of accessing the edit data structure to perform the first text editing operation comprising the substeps of:

using the first array data unit to obtain the first two-dimensional array;

obtaining second and third two-dimensional arrays from the first two-dimensional array, the second two-dimensional array defining the first character, the third two-dimensional array defining the second character;

obtaining second and third array data units respectively defining the second and third two-dimensional arrays; and performing the first text editing operation using the second array data unit.

42. The method of claim 41 in which the step of accessing the edit data structure to perform the first text editing operation further comprises including the second and third array data units in the edit data structure and removing the first array data unit from the edit data structure.

43. The method of claim 42 in which the processor is further connected for providing update data defining redrawing of a view of the image presented on an image output device, the processor further being connected for accessing redraw data, the redraw data indicating the update data to be provided, the performing substep including changing the redraw data only if the first text editing operation modifies the view of the image, the processor not changing the redraw data if the only change in the edit data structure is to include the second and third array data units and remove the first array data unit.

44. The method of claim 41 in which the text includes first and second lines of characters, the first line including the first character and the second line including the second character, the first and second lines being separated by an interline space, the substep of obtaining the second and third two-dimensional arrays comprising:

obtaining interline space position data indicating a position of the interline space separating the first and second lines; and using the interline space position data to obtain the second and third two-dimensional arrays, the second two-dimensional array including the first line and the third two-dimensional array including the second line.

45. The method of claim 41 in which the text includes a first line that includes the first and second characters, the first and second characters being separated by an intercharacter space, the substep of obtaining the second and third array two-dimensional arrays further comprising:

obtaining intercharacter space position data indicating a position of the intercharacter space separating the first and second characters using the first two-dimensional array;

using the intercharacter space position data to obtain the second and third two-dimensional arrays.

46. The method of claim 41 in which the processor is further connected for receiving requests for text editing operations from a user input device, the step of receiving the first request comprising receiving a signal indicating a position in the first character.

47. The method of claim 41 in which the substep of obtaining the second and third two-dimensional arrays comprises the substep of finding a set of at least one connected component, the second two-dimensional array including the set of at least one connect component, the set of at least one connected component forming the first character.

48. The method of claim 47 in which the region includes first and second connected components, the substep of finding the connected component set comprising the substeps of:

obtaining first and second connected component position data, the first connected component position data indicating a position of the first connected component, the second connected component position data indicating a position of the second connected component; and using the first and second connected component position data to determine whether the first and second connected components are likely to form a character.

49. The method of claim 48 in which the substep of obtaining first and second connected component position data comprises obtaining first and second bounding box position data defining first and second bounding boxes, the first bounding box including the first connected component and the second bounding box including the second connected component, the substep of using the first and second connected component position data comprising comparing the first and second bounding box position data to determine the relative positions of the first and second bounding boxes.

50. The method of claim 48 in which, if the substep of using the first and second connected component position data determines that the first and second connected components are likely to form a character, the substep of obtaining the second and third two-dimensional arrays further comprises obtaining the second two-dimensional array so that it includes the first and second connected components.

51. The method of claim 48 in which, if the substep of using the first and second connected component position data determines that the first and second connected components are not likely to form a character, the substep of obtaining the second and third two-dimensional arrays further comprises obtaining the second two-dimensional array so that it includes the first connected component and does not include the second connected component.

52. The method of claim 41 in which the processor is further connected for receiving signals indicating operation of a key on a keyboard, the method further comprising:

receiving a second request for a second text editing operation, the second request requesting that the first character be assigned to the key; and in response to the second request, storing assignment data indicating that the second two-dimensional array is assigned to the key.

53. The method of claim 52, further comprising:

receiving a first signal indicating operation of the key;

in response to the first signal, accessing the assignment data to determine that the second two-dimensional array is assigned to the key; obtaining a fourth array data unit, the fourth array data unit defining the second two-dimensional array; and including the fourth array data unit in the edit data structure.

54. The method of claim 52, further comprising:

receiving a third request for a third text editing operation, the third request requesting a search, the third request including a second signal indicating operation of the key;

in response to the third request, accessing the assignment data to determine that the second two-dimensional array is assigned to the key; and accessing the edit data structure to search for array data units defining two-dimensional arrays that define regions that match the second two-dimensional array.

55. The method of claim 54 in which the step of accessing the edit data structure to search comprises searching for array data units defining two-dimensional arrays that match the second two-dimensional array.

56. The method of claim 41 in which the text that includes a third character, the step of accessing the edit data structure to perform the first text editing operation further comprising the substeps of:

obtaining a fourth two-dimensional array obtained from the first two-dimensional array, the fourth two-dimensional array defining the third character; and obtaining a fourth array data unit defining the fourth two-dimensional array.

57. A system comprising:

an edit data structure for including array data units, each defining a respective two-dimensional array of data, each respective two-dimensional array defining a respective region of an image that includes text;

a processor; the processor being connected for accessing the edit data structure; the processor further being connected for receiving requests for text editing operations; the processor, upon receiving a request for a first text editing operation affecting a character in the text, accessing a first array data unit in the edit data structure, the first array data unit defining a first two-dimensional array, the respective region defined by the first two-dimensional array including the character; upon receiving the request for the first text editing operation, the processor further using the first array data unit to obtain the first two-dimensional array and obtaining a second two-dimensional array defining a respective region of the image from the first two-dimensional array, the respective region defined by the second two-dimensional array being a part of the respective region defined by the first two-dimensional array and including the character; upon receiving the request for the first text editing operation, the processor further obtaining a second array data unit defining the second two-dimensional array.

58. The system of claim 57, further comprising a user input device for providing the requests for text editing operations to the processor, the user input device further being for providing signals indicating positions within the image, the request for the first text editing operation including a signal from the user input device indicating a position in the character, the edit data structure further including, for each of the array data units, respective spatial data indicating spatial information about the respective two-dimensional array; in responding to the first request, the processor using the signal and the respective spatial data of the first two-dimensional array to determine whether to access the first two-dimensional array.

59. The system of claim 57, further comprising an image input device and an image input data structure, the processor being connected for receiving image input signals defining the image from the image input device, the processor obtaining image input data defining the image from the image input signals, the processor further being connected for accessing the image input data structure for including the image input data in the image input data structure; the processor further accessing the image input data structure to obtain the first two-dimensional array from the image input data, the processor obtaining the first array data unit defining the first two-dimensional array and including the first array data unit in the edit data structure.

60. The system of claim 59 in which the image input device is a scanner.

61. The system of claim 57, further comprising an image output device, the processor being connected for providing image output data to the image output device so that the image output device can present a view of the image, the processor accessing the edit data structure and obtaining the image output data from the edit data structure.

62. A method of operating a processor, the processor being connected for accessing first image data, the first image data including a first two-dimensional array of data that defines a first image, the first image including two or more characters in a first line, the characters including a first character; the processor further being connected for receiving requests for text editing operations; the method comprising acts of:

receiving a request for a character level text editing operation affecting the first character;

in response to the request, using the first image data to produce second image data defining a second image, the act of using the first image data to produce second image data comprising:

obtaining a second two-dimensional array of data from the first two-dimensional array, the second two-dimensional array defining the first character and not defining any of the characters other than the first character; and producing the second image data using the second two-dimensional array so that the second image differs from the first image in accordance with the character level text editing operation.

63. A method of operating a processor, the processor being connected for accessing first image data, the first image data including a first two-dimensional array of data that defines a first image, the first image including two or more characters in a first line including a first character; the processor further being connected for receiving requests for text editing operations; the method comprising acts of:

receiving a first request for a first character level text editing operation on the image;

in response to the first request, using the first image data to produce second image data defining a second image, the act of using the first image data to produce the second image data comprising:

obtaining first character spatial data from the first two-dimensional array, the first character spatial data indicating spatial information about the first character; and producing the second image data using the first character spatial data so that the second image differs from the first image in accordance with the first character level text editing operation.

64. A method of operating a processor, the processor being connected for accessing first image data, the first image data including a first two-dimensional array of data that defines a first image, the first image including a text that includes first and second characters; the processor further being connected for receiving requests for text editing operations; the method comprising acts of:

receiving a first request for a first text editing operation on the text, the first text editing operation affecting the first character;

in response to the first request, using the first image data to produce second image data defining a second image, the act of using the first image data to produce the second image data comprising:

obtaining second and third two-dimensional arrays of data from the first two-dimensional array, the second two-dimensional array defining the first character, the third two-dimensional array defining the second character; and producing the second image data using the second two-dimensional array so that the second image differs from the first image in accordance with the first text editing operation.

65. A system comprising:

first image data including a first two-dimensional array of data, the first two-dimensional array defining a first image that includes text, the text including a first character;

a processor; the processor being connected for accessing the first image data; the processor further being connected for receiving requests for text editing operations; the processor, upon receiving a request for a first text editing operation affecting the first character, using the first image data to produce second image data defining a second image by using the first two-dimensional array to obtain a second two-dimensional array defining a part of the first image that includes the first character and by using the second two-dimensional array to produce the second image data so that the second image differs from the first image in accordance with the first text editing operation.

66. A method of operating a processor, the processor being connected for accessing an edit data structure, the edit data structure including a first two-dimensional array of data that defines a region of an image, the region including two or more elements in a first line, the elements including a first element; the processor further being connected for receiving requests for text editing operations; the method comprising the steps of:

receiving a request for a character level text editing operation affecting the first element;

in response to the request, accessing the edit data structure to perform the character level text editing operation, the step of accessing the edit data structure to perform the operation comprising the substeps of:

accessing the first two-dimensional array of data;

obtaining a second two-dimensional array of data from the first two-dimensional array, the second two-dimensional array defining the first element and not defining any of the elements other than the first element; and performing the operation using the second two-dimensional array; the substep of performing the operation comprising including the second two-dimensional array in the edit data structure.

67. A method of operating a system that includes a processor, user input circuitry, image input circuitry, and image output circuitry; the processor being connected for receiving user signals indicating user actions from the user input circuitry; the processor being connected for receiving image data defining images from the image input circuitry; the processor being connected for providing image data defining images to the image output circuitry; the image output circuitry being capable of presenting images to a user in response to image data defining images; the method comprising acts of:

receiving first input image data from the image input circuitry; the first input image data including a first array of data defining a first image, the first image including two or more characters in a text;

providing first output image data to the image output circuitry; the first output image data defining a version of the first image; the image output circuitry presenting the version of the first image to a user in response to the first output image data;

receiving a first user signal from the user input circuitry; the first user signal indicating a user request for a character level text editing operation on the first image; the first user signal being provided by the user through an action in accordance with a conventional text editing system; the conventional text editing system being a system that would operate on information defining character identities;

in response to the first user signal, using the first input image data to obtain second output image data defining a second image that is a modified version of the first image that differs from the first image in accordance with the user request for the character level text editing operation; and providing the second output image data to the image output circuitry; the image output circuitry presenting the second image to the user in response to the second output image data.

68. The method of claim 67 in which the second output image data includes a second array of data defining the second image; the act of using the first input image data to obtain the second output image data comprising an act of obtaining a character-size array from the first array; the character-size array defining a first one of the plurality of characters in the text and not defining any of the characters in the text other than the first character.

69. The method of claim 68 in which the act of using the first input image data to obtain the second output image data does not include recognizing the first character.

70. The method of claim 67 in which the first user signal indicates a request for a character level text editing operation that includes inserting a character into the text.

71. The method of claim 67 in which the first user signal indicates a request for a character level text editing operation that includes deleting one of the characters in the text.

72. The method of claim 67 in which the first user signal indicates a request for a character level text editing operation that includes inserting a space between two of the characters in the text.

73. The method of claim 67 in which the first user signal indicates a request for a character level text editing operation that includes deleting a space between two of the characters in the text.

74. The method of claim 67 in which the first user signal indicates a request for a character level text editing operation that includes changing cursor position within the text.

75. The method of claim 67 in which the first user signal indicates a request for a character level text editing operation that includes adjusting a space between two of the characters in the text.

76. A system comprising:

user input circuitry obtaining user signals indicating user actions;

image input circuitry obtaining image data defining images;

image output circuitry presenting images to a user in response to image data defining images; and a processor; the processor being connected for receiving user signals from the user input circuitry; the processor being connected for receiving image data from the image input circuitry; the processor being connected for providing image data defining images to the image output circuitry;

the processor, upon receiving first input image data from the image input circuitry, providing first output image data to the image output circuitry; the first input image data including a first array of data defining a first image, the first image including two or more characters in a text; the first output image data defining a version of the first image; the image output circuitry presenting the version of the first image to a user in response to the first output image data;

the processor, upon receiving a first user signal from the user input circuitry, using the first input image data to obtain second output image data defining a second image and providing the second output image data to the image output circuitry; the first user signal indicating a user request for a character level text editing operation on the first image; the first user signal being provided by the user through an action in accordance with a conventional text editing system; the conventional text editing system being a system that would operate on information defining character identities; the second image being a modified version of the first image that differs from the first image in accordance with the user request for the character level text editing operation; the image output circuitry presenting the second image to the user in response to the second output image data.

77. The system of claim 76 in which the image input circuitry comprises a scanner.

78. The system of claim 76 in which the user input circuitry comprises a keyboard.

79. The system of claim 76 in which the image output circuitry comprises a display.

* * * * *